United States Patent
Mollick

(10) Patent No.: US 10,966,363 B2
(45) Date of Patent: *Apr. 6, 2021

(54) CONNECTOR SYSTEM FOR MOBILE MACHINERY

(71) Applicant: Peter Mollick, Phoenix, AZ (US)

(72) Inventor: Peter Mollick, Phoenix, AZ (US)

(*) Notice: Subject to any disclaimer, the term of this patent is extended or adjusted under 35 U.S.C. 154(b) by 75 days.

This patent is subject to a terminal disclaimer.

(21) Appl. No.: 16/026,475

(22) Filed: Jul. 3, 2018

(65) Prior Publication Data

US 2019/0223369 A1  Jul. 25, 2019

Related U.S. Application Data

(60) Provisional application No. 62/762,278, filed on Apr. 27, 2018, provisional application No. 62/709,417, filed on Jan. 19, 2018.

(51) Int. Cl.

| | | |
|---|---|---|
| A01B 63/00 | (2006.01) |
| A01B 59/00 | (2006.01) |
| A01B 59/043 | (2006.01) |
| A01B 59/048 | (2006.01) |
| A01B 59/06 | (2006.01) |
| A01B 69/04 | (2006.01) |
| G05D 1/02 | (2020.01) |
| A01B 63/02 | (2006.01) |
| B60W 50/14 | (2020.01) |

(52) U.S. Cl.
CPC .......... *A01B 59/004* (2013.01); *A01B 59/043* (2013.01); *A01B 59/048* (2013.01); *A01B 59/062* (2013.01); *A01B 63/004* (2013.01); *A01B 63/023* (2013.01); *A01B 69/008* (2013.01); *G05D 1/0278* (2013.01); *B60W 2050/146* (2013.01); *B60W 2420/42* (2013.01); *B60W 2420/62* (2013.01); *G05D 2201/0201* (2013.01)

(58) Field of Classification Search
CPC ..... A01B 59/004; A01B 59/043; A01B 59/06; A01B 59/066; A01B 63/004; A01B 63/023; A01B 63/118
See application file for complete search history.

(56) References Cited

U.S. PATENT DOCUMENTS

| | | |
|---|---|---|
| 3,208,535 A | 9/1965 | Fischer |
| 3,312,478 A | 4/1967 | Knaapi |
| 3,846,923 A | 11/1974 | Whittier |
| 4,019,753 A | 4/1977 | Kestel |
| 4,060,254 A | 11/1977 | Ernst |
| 4,463,811 A | 8/1984 | Winter |

(Continued)

FOREIGN PATENT DOCUMENTS

EP  2283719 A2 *  2/2011  ............. A01B 59/06

OTHER PUBLICATIONS

International Search Report for PCT/US17/26373 dated Jul. 3, 2017.

(Continued)

*Primary Examiner* — Gary S Hartmann

(57) ABSTRACT

An apparatus for connecting an implement to mobile machinery comprises a first frame work, a slidable second frame work, and at least one support member. The support member provides support for the second framework as it slides back and forth along the first frame work.

16 Claims, 22 Drawing Sheets

(56) References Cited

U.S. PATENT DOCUMENTS

| | | | | |
|---|---|---|---|---|
| 4,878,713 | A * | 11/1989 | Zanetis | E01C 23/088 299/39.5 |
| 4,930,581 | A | 6/1990 | Fleischer et al. | |
| 5,203,615 | A | 4/1993 | Zanetis et al. | |
| 5,378,081 | A * | 1/1995 | Swisher, Jr. | E01C 23/088 299/39.5 |
| 5,626,197 | A * | 5/1997 | Tseng | E01C 23/082 172/540 |
| 5,931,234 | A | 8/1999 | Trowbridge | |
| 6,308,785 | B1 * | 10/2001 | Rhoden | A01B 31/00 172/393 |
| 8,246,271 | B2 * | 8/2012 | Verhoff | E01C 19/38 404/117 |
| 9,913,422 | B2 | 3/2018 | Mitchel et al. | |
| 10,455,753 | B2 * | 10/2019 | Mollick | A01B 59/043 |
| 2002/0144829 | A1 | 10/2002 | Alexander et al. | |
| 2007/0000673 | A1 | 1/2007 | Farnsworth et al. | |
| 2012/0085559 | A1 | 4/2012 | Schwalenberg et al. | |
| 2020/0000001 | A1 * | 1/2020 | Mollick | A01B 63/14 |
| 2020/0037489 | A1 * | 2/2020 | Mollick | A01B 59/048 |
| 2020/0107485 | A1 * | 4/2020 | Defrancq | A01B 59/066 |

OTHER PUBLICATIONS

"LaForge DynaTrac Active Implement Guidance Interface Solutions Brochure". Nov. 2017.

"Laforge to Introduce DynaTrac During Agritechnica 2017", Product Innovations, Oct. 26, 2017.

* cited by examiner

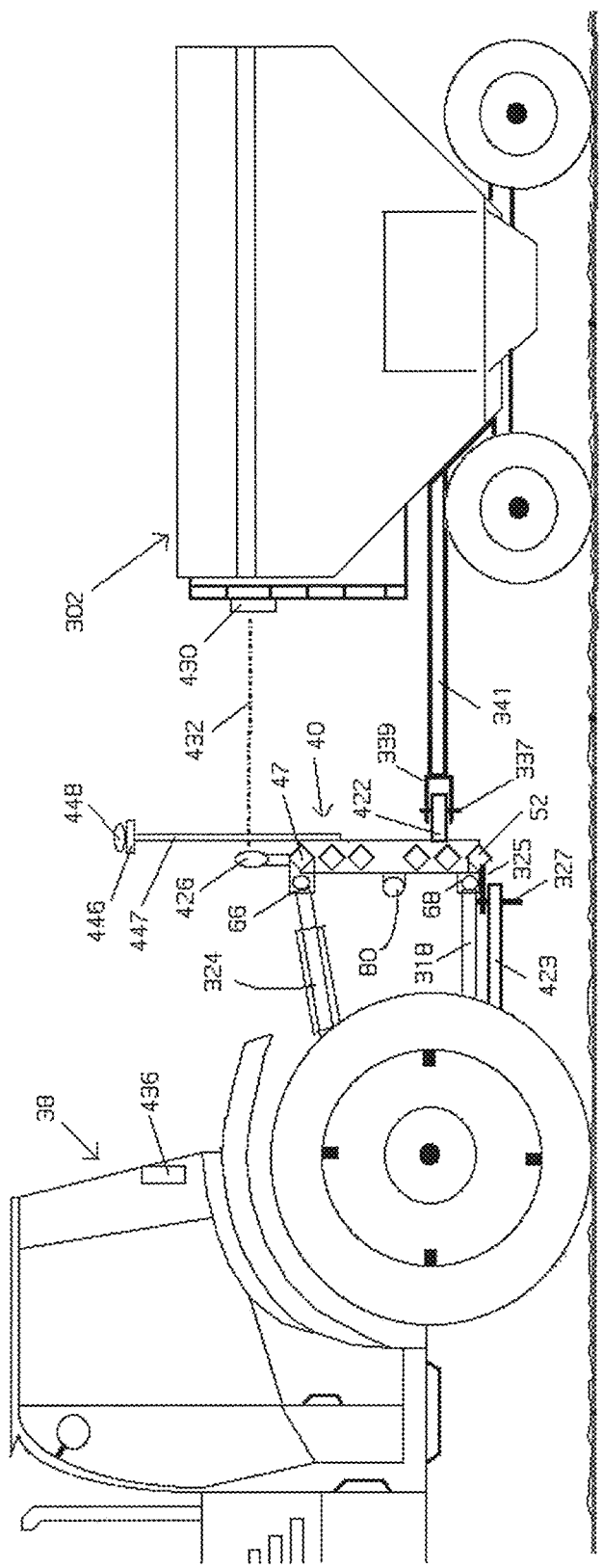
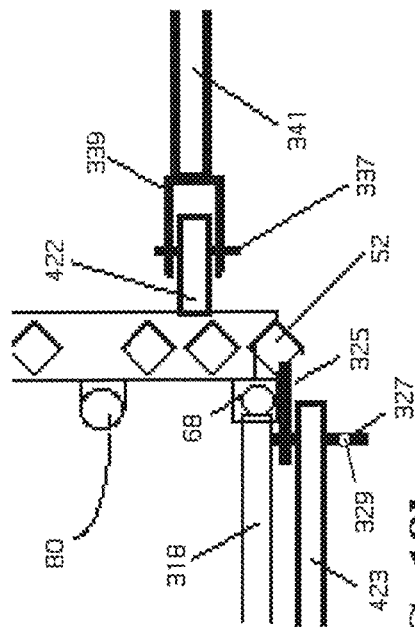
FIG. 18a
FIG. 18b

CONNECTOR SYSTEM FOR MOBILE MACHINERY

CROSS REFERENCE TO RELATED APPLICATIONS

This application is related to U.S. patent application Ser. No. 15/480,914 filed on Apr. 6, 2017, which is incorporated herein by reference in its entirety, and which claims the benefit of U.S. Provisional Patent Application Ser. No. 62/390,693 titled "Laterally adjustable 3-point hitch attachment device" filed Apr. 7, 2016, and U.S. Provisional Patent Application No. 62/496,424 titled "Laterally adjustable three-point hitch implement apparatus," filed Oct. 18, 2016, the contents of which are incorporated herein by reference in their entirety. This application claims the benefit of U.S. Provisional Patent Application Ser. No. 62/762,278 filed Apr. 27, 2018, and provisional application Ser. No. 62/709,417 filed Jan. 19, 2018, both of which are incorporated herein by reference in their entirety. This application is related to U.S. Provisional Patent Application Ser. No. 62/707,447 filed Nov. 3, 2017, which is incorporated herein by reference in its entirety.

BACKGROUND

My pending U.S. patent application Ser. No. 15/480,914 describes a connecting apparatus suitable for connecting an implement to a 3-point hitch of mobile machinery. The present invention is directed to a sturdier construction for the connecting apparatus, and a control and navigation system.

SUMMARY

An apparatus for connecting an implement to mobile machinery comprises a first framework and a slidable second framework. The first framework is in a plane and comprises a first crossbeam, and generally two crossbeams, an upper crossbeam and a lower crossbeam. The slidable second framework is generally in the plane of the first framework and slides laterally back and forth along the first framework parallel to the crossbeams. A first support member is mounted on at least one of the (i) the second framework for engaging one of the crossbeams or (ii) the one of the crossbeams for engaging the second framework. Preferably there are support members for both crossbeams.

In addition to added support members, the addition of a drawbar connected towing plate coupling is shown.

Further shown are communications between a towed implement linear position in relation to the position of the disclosed apparatus. Still further shown are height gauging members to set the above grade height of the apparatus while also providing secondary height support to the entire apparatus while in use.

The first framework can comprise at least one rail, and preferably first and second parallel, vertically spaced apart, laterally extending rails parallel to the cross beams. Support members typically are mounted on both crossbeams proximate to the second framework, or on the second framework proximate to both crossbeams, or in both locations. The support members can provide resistance against vertical (up and down) forces, lateral (forward and backward), and both. The support members proximate to the lower crossbeam provide support to the second framework against vertical forces. The support members can be rollers such as wheels. Preferably all the support members for the second framework provide support against horizontal (forward and backward) forces, such as using v-shaped wheels as the support members. The wheels can have the rolling surface of the wheels be concave for secure engagement and both vertical and horizontal support to the second framework.

It is desirable that the support members have a low coefficient of friction to avoid interfering with the lateral (side-to-side) movement of the second framework.

Optionally the support members can comprise a sliding plate on the crossbeam, the second framework, or both the crossbeam and the second framework, each sliding plate having a sliding surface. Typically each crossbeam and the proximate portion of the second framework has a sliding plate. Preferably the sliding surface of each sliding plate has a static coefficient of friction of less than 0.3. Instead of or in addition to having a low coefficient of friction for the sliding plate, there can be a lubricant, such as grease, on the sliding plate.

As disclosed in my prior application, generally there is at least one connector supported by the slidable second framework for connecting the slidable second framework to an implement that can be pulled or pushed by the mobile machinery. Similarly typically the mobile machinery has a 3-point hitch and the apparatus comprises at least one, and preferably at least three attachments supported by the first framework for attachment to the 3-point hitch. The apparatus can also include a driver connected to the slidable second framework for driving the slidable second framework laterally back and forth along the rails. The driver can also be connected to and supported by the first framework.

The invention includes a system comprising the mobile machinery connected to the apparatus and a towed or pushed implement connected to the apparatus, the apparatus comprising the first framework and the second framework, which is laterally slideable relative to the first framework. The second framework is also referred to as a towing mechanism. The first framework is connected to the mobile machinery. The system can also comprise a local first sensing system for generating a first signal indicating the relative position of the first framework and the attached implement; a second sensing system for generating a second signal indicating the position of the first framework relative to the position of the second framework; a position sensing device such as a Global Positioning System ("GPS") device on the towing mechanism for generating a third signal indicating the position of the towing mechanism; and a controller. The controller is adapted for receiving the first, second, and third signals; from the received signals, through programming determining the position of the implement; comparing the determined position to a desired path for the implement, the desired path stored in memory associated with the controller; and if the determined position is different than the desired path, adjusting the position of the implement.

The invention also includes a method of using this system. A method for the lateral control of the implement can comprise (a) determining the lateral position of the implement relative to the position of the first framework with the local position sensing system, which has a component on the implement and a component on the first framework; (b) determining the lateral relative position of the first framework and the towing mechanism, preferably using GPS: (c) determining the position of the towing mechanism; (d) determining the position of the implement utilizing the positions determined in steps (a), (b), and (c); (e) comparing the determined position of step (e) to a desired path for the implement; and (f) if the determined position is different than the desired path, sending a signal to change the position of the implement. Step (b) can comprise receiving input from a sensor on the first framework and another sensor on the towing mechanism. Step (a) can comprise sending a detection signal from the first framework to a detection signal receiver on the implement. Other positioning systems can replace the GPS, such as a Local Area Network (LAN) with a range of about six miles and performing functions similar to a GPS arrangement minus the satellites.

To be able to tow heavy equipment without damaging a tractor lifting arms and the associated mechanism the first framework lower crossbeam can be releasably connected to the mobile machinery with a drawbar using a coupling, where preferably the coupling connection is rigid. For example as system comprises (a) mobile machinery having vertically adjustable arms and a non-vertically adjustable rigid drawbar with at least two holes therethrough; (b) a coupling comprising a body with at least two pins depending therefrom, one pin in each hole; and (c) an implement connected to the mobile machinery by the arms and the coupling. Preferably for increased stability and less torque on the system, here are three holes in the drawbar and the coupling has three pins, one in each hole. Preferably this system utilizes the connecting apparatus described above, where the towed implement is connected to the connecting apparatus that is connected to the mobile machinery by the arms and the coupling.

Optionally there can be at least one apparatus height gauge member attached to the first framework or to the second framework, and preferably at least two apparatus height gauge members, at least one height gauge member attached to the first framework or at least one height gauge member attached to the second framework. The height gauge members added to the apparatus allow for setting the optimal above grade working height of the apparatus and attached implement to be easily set and maintained while in use. The height gauging members also provide additional support to the three-point hitch above grade holding abilities.

DRAWINGS

These and other features, aspects and the advantages of the present invention will become better understood with the following description, the appended claims and accompanying drawings, wherein:

Figure 1:
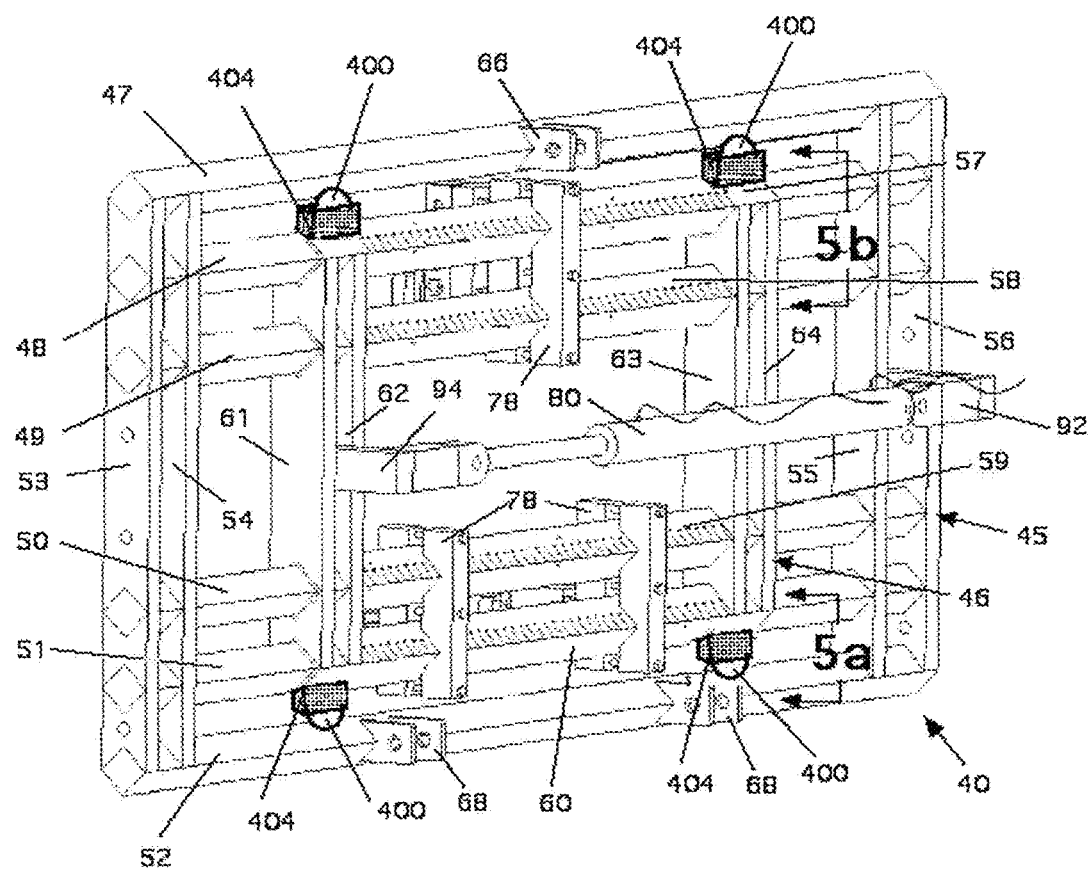
FIG. 1 is a perspective view of a first version of a connecting apparatus having features of the present invention, showing a mobile machinery-facing side of the apparatus with V-groove wheels attached to an underside and a topside of a second framework.
Figure 14:
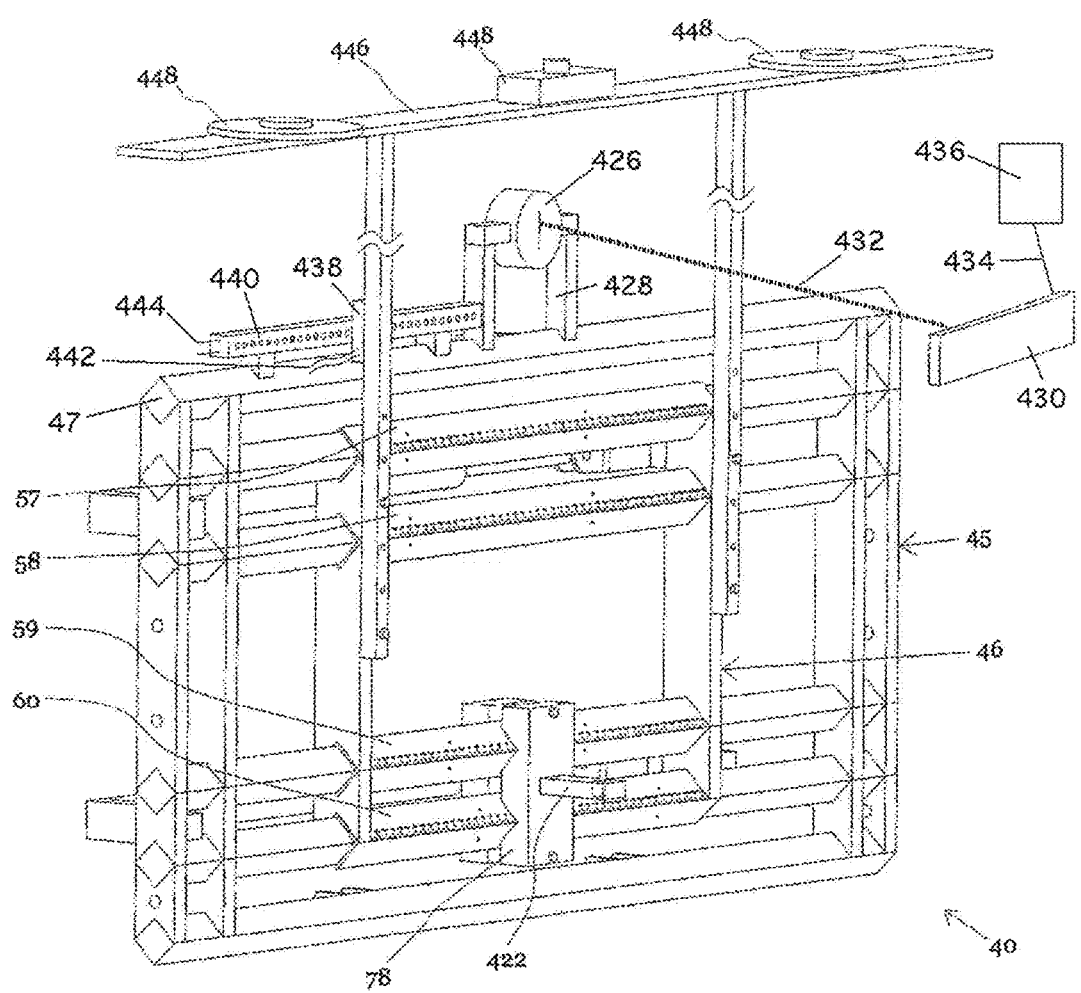
Figure 15:
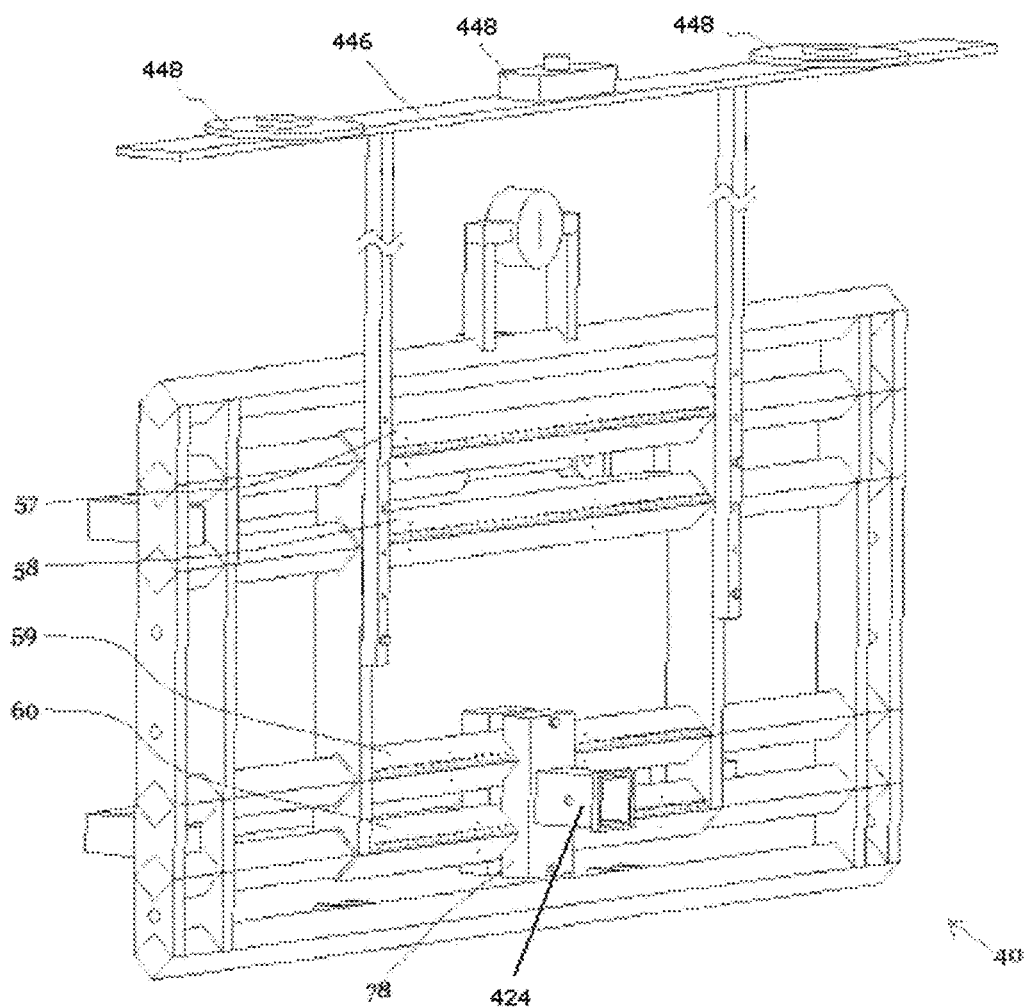

FIG. 14 is a perspective view of the implement facing side of a seventh version of an apparatus having features of the present invention, the seventh version being similar to that of FIG. 1 showing a towing drawbar configuration in place of a three-point attachment configuration; and FIG. 15 is a perspective view of the implement facing side of an eighth version of an apparatus having features of the present invention, similar to that of FIG. 14, showing a towing receiver hitch configuration in the place of a drawbar configuration.

Figure 2:
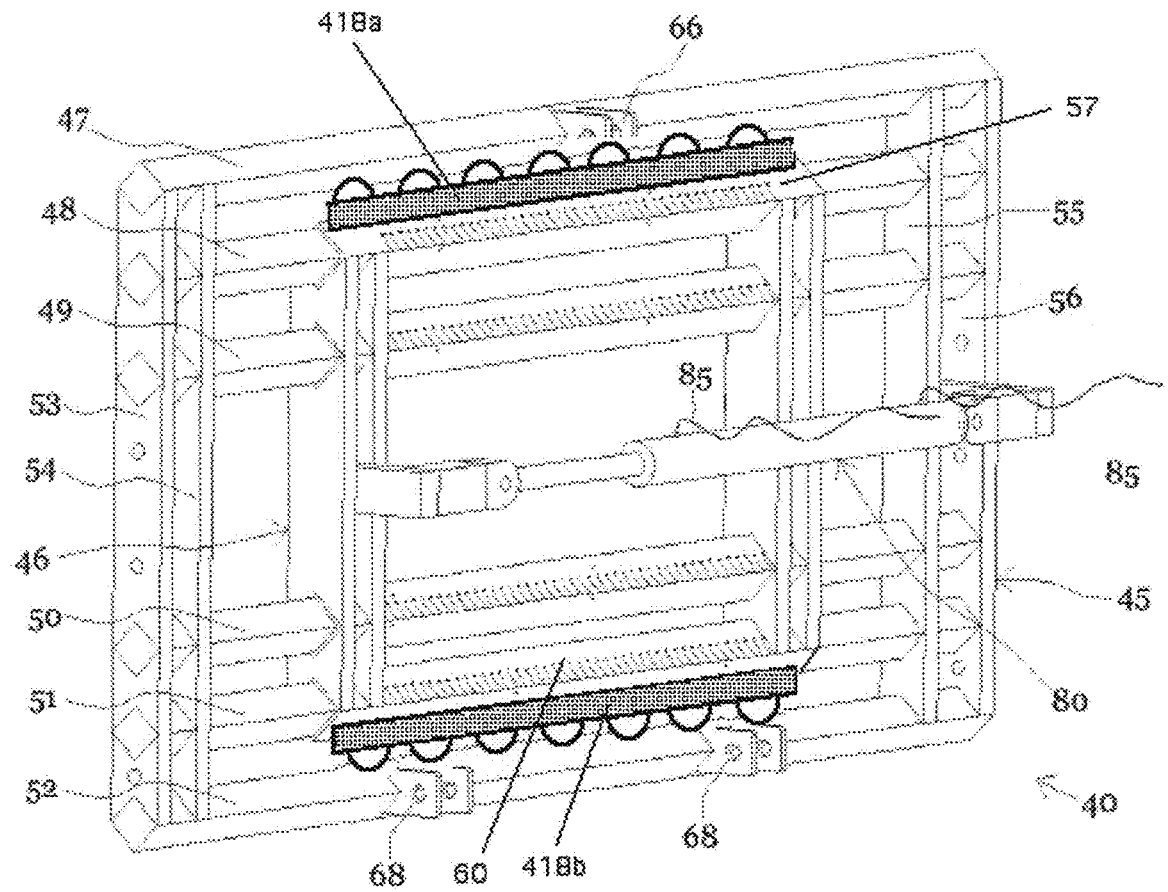
FIG. 2 is a perspective view of a mobile machinery facing side of a second version of an apparatus having features of the present invention, similar to that of FIG. 1, showing wheel racks mounted on a top side and bottom side of a second framework allowing the wheels to roll on a first framework top and bottom crossbeams.
Figure 9:
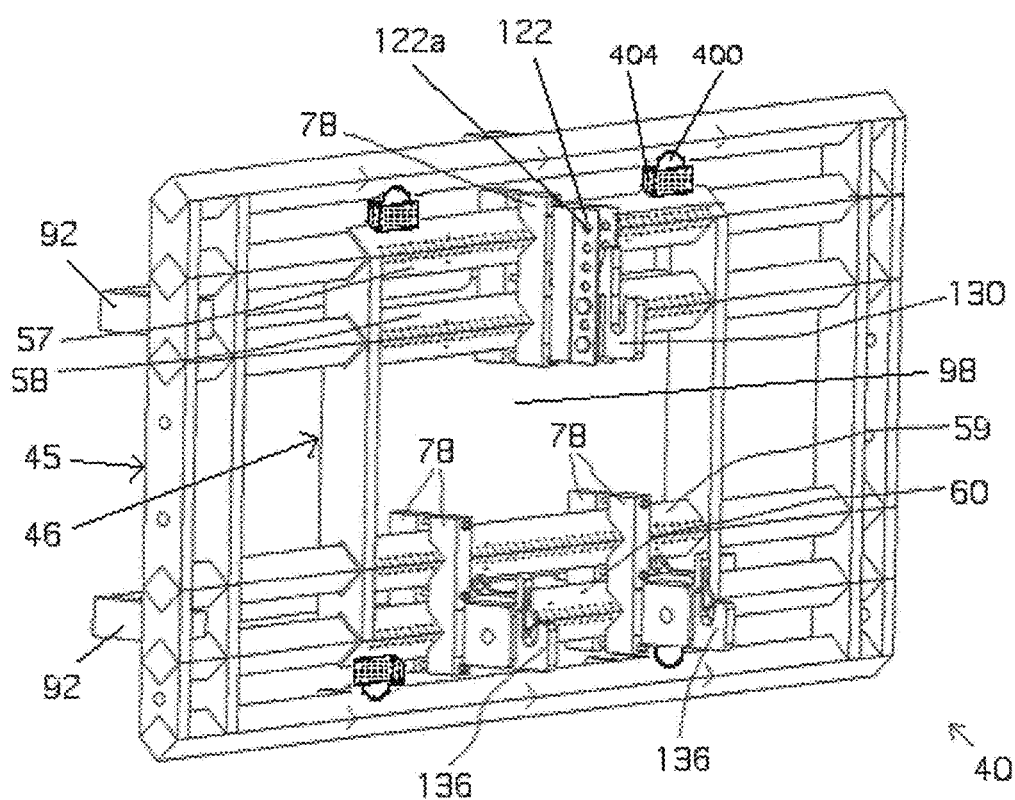
FIG. 9 is a perspective view of the connecting apparatus of FIG. 1, showing the implement-facing side of the apparatus and the positions of connectors as the connectors can be positioned to connect to an implement.
Figure 16:
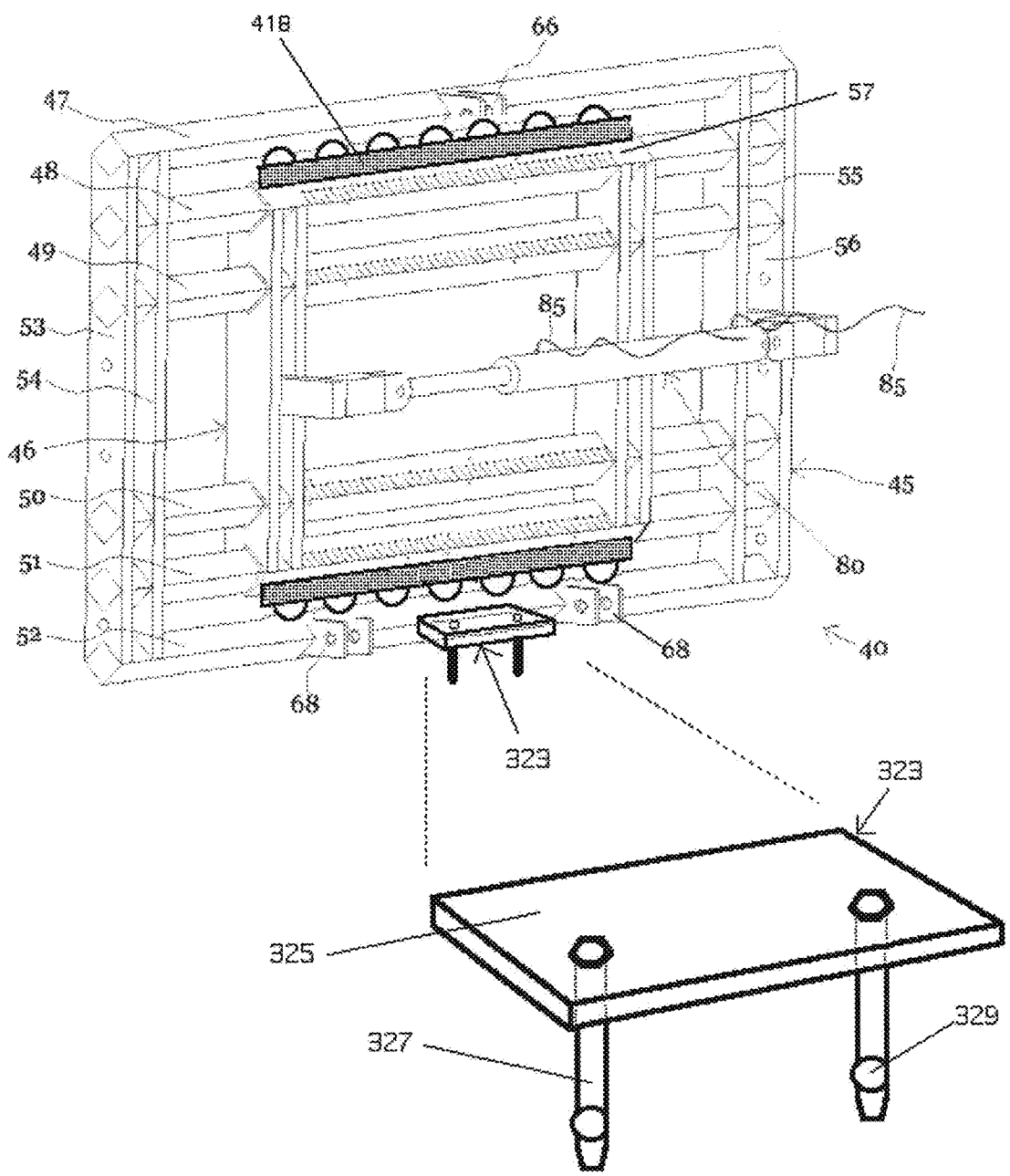
Figure 17:
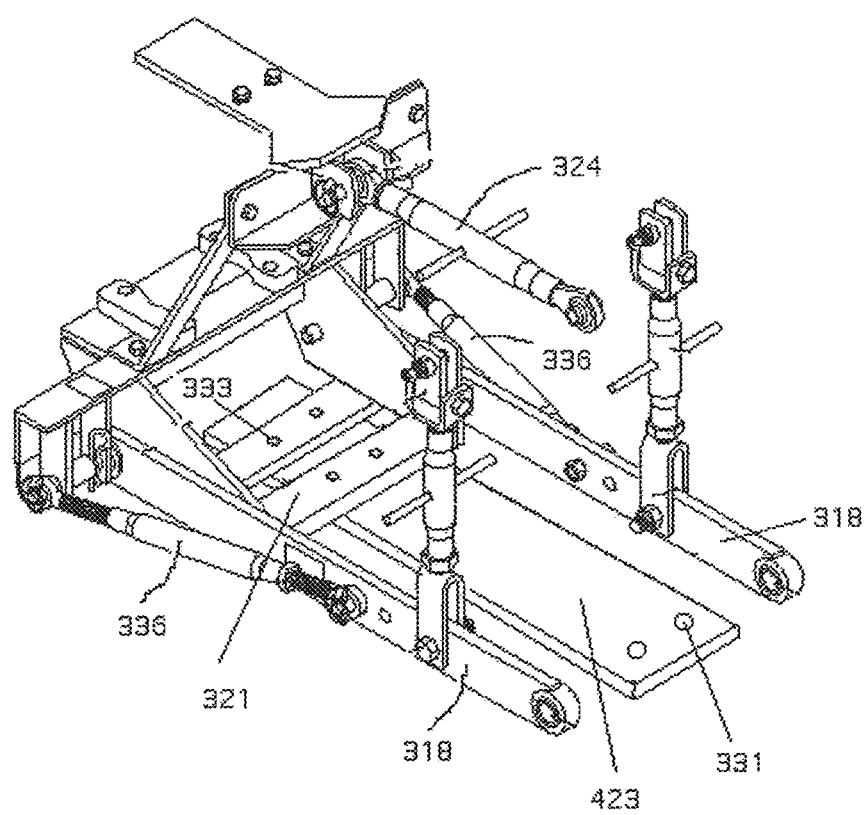
Figure 19:
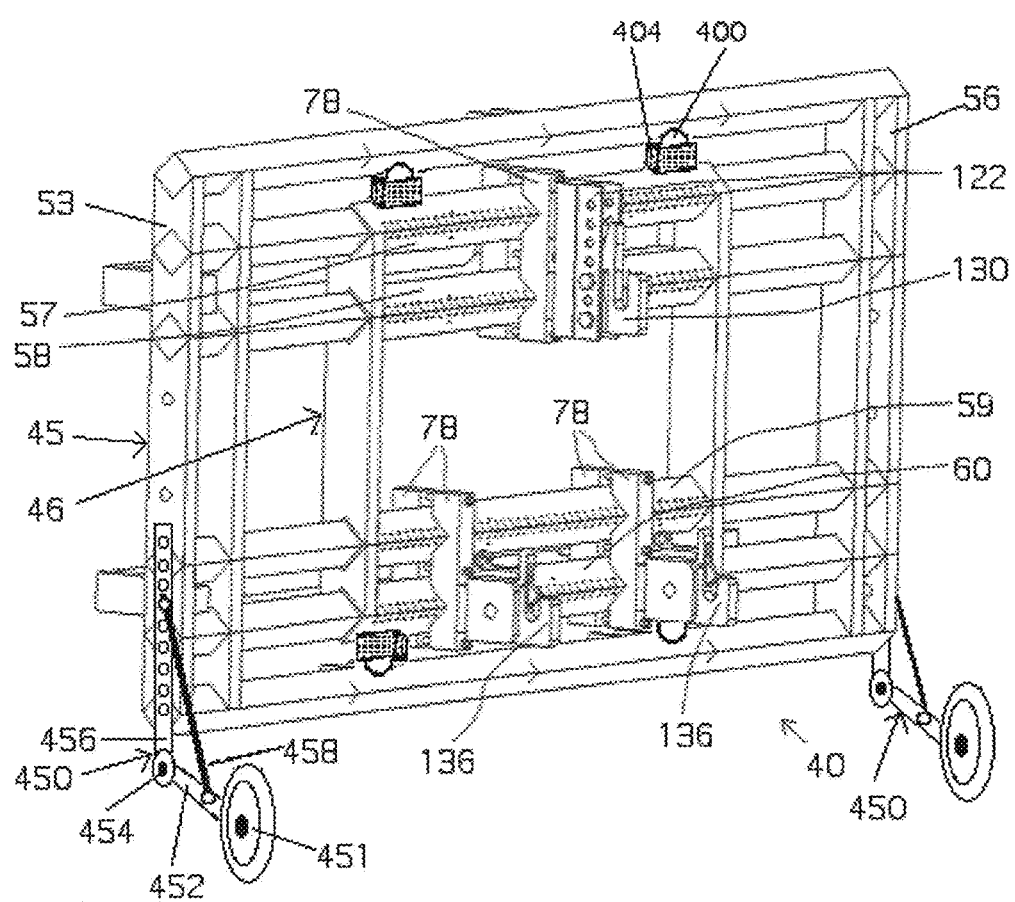
Figure 20:
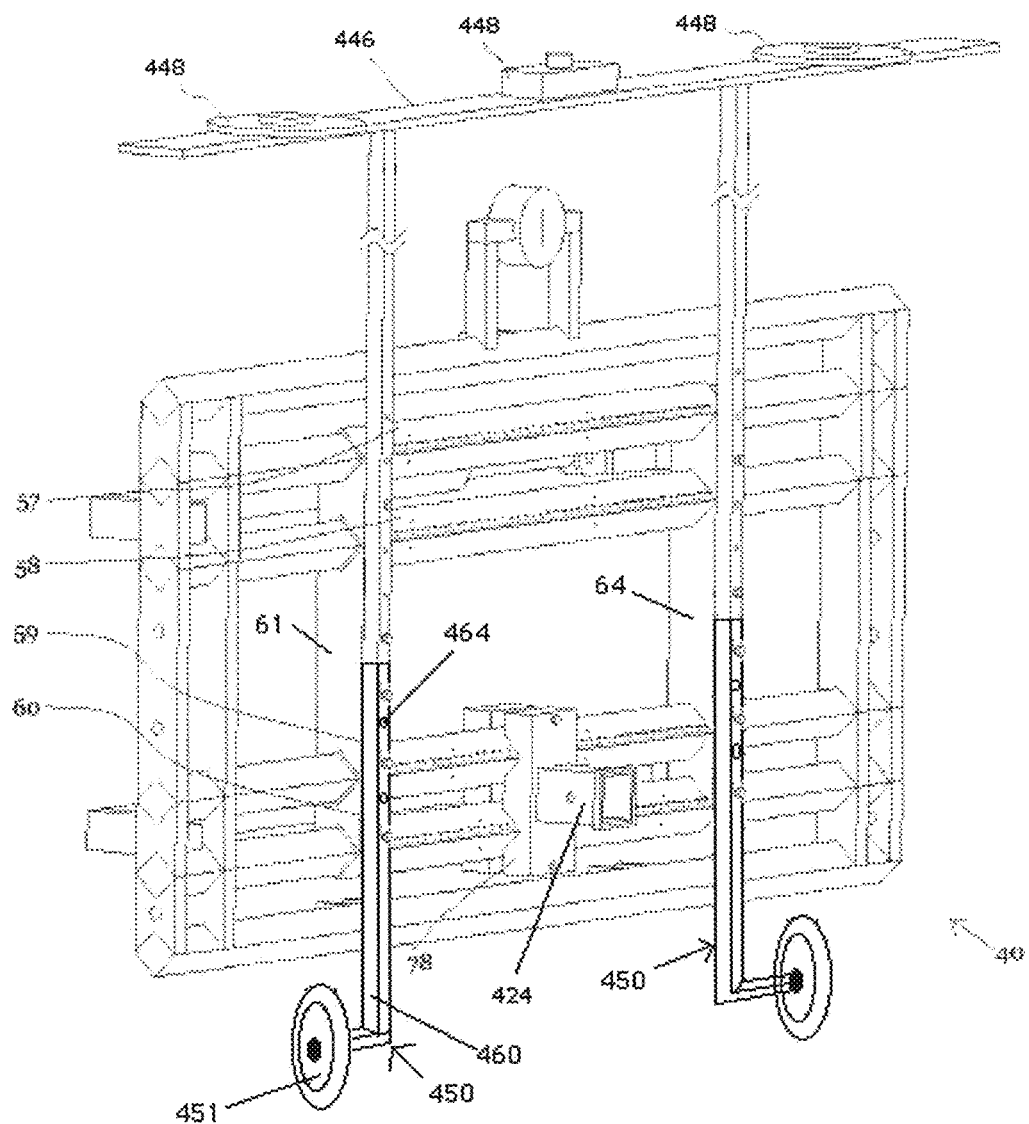
Figure 21:
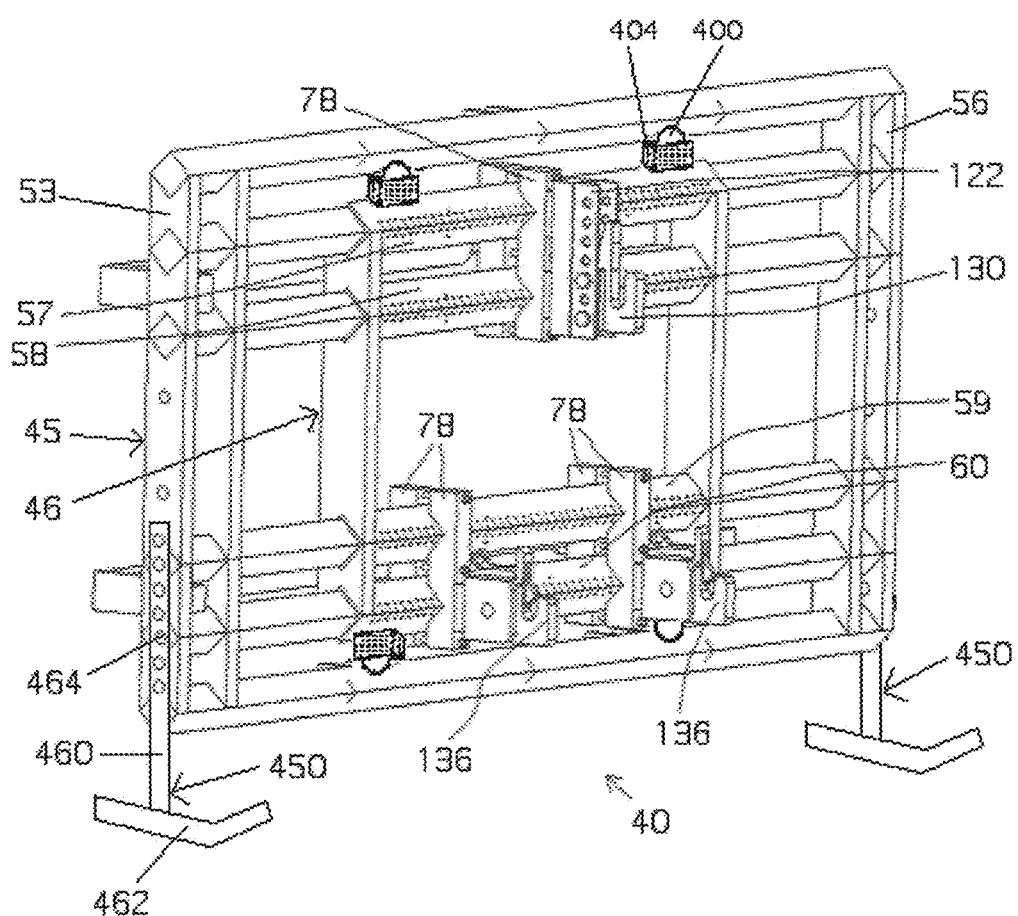
Figure 22:
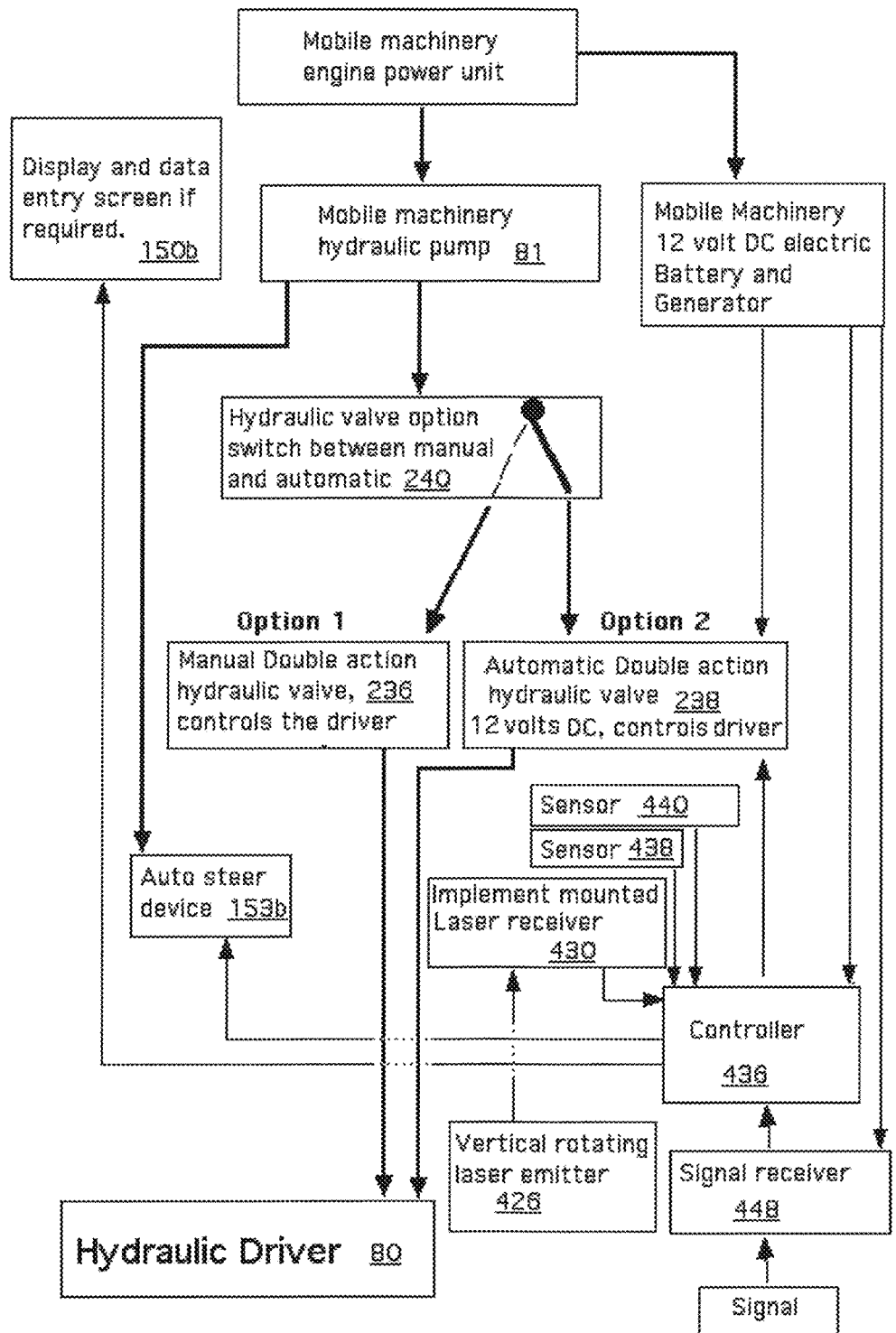

FIG. 16 is a perspective view of the mobile machinery facing side of an apparatus similar to that of FIG. 2 showing an add tow coupling with support plate with attached pins;

FIG. 17 is a perspective view showing a prior art three-point hitch arrangement with its various parts attached including a drawbar designed for towing an implement;

FIG. 18a is a side view of a tractor towing an implement with the connecting apparatus of FIG. 14 attached to the tractor three-point hitch and the implement;

FIG. 18b is a close-up view of FIG. 18a showing the tractor drawbar, apparatus towing coupling and implement towing hitch arm;

FIG. 19 is a perspective view of the implement facing side of a ninth version of an apparatus having features of the present invention, similar to that of FIG. 9, showing added height gauge members and wheels mounted to the first framework;

FIG. 20 is a perspective view of the implement facing side of a tenth version of an apparatus having features of the present invention the apparatus, similar to that of FIG. 19, showing added height gauge members and wheels mounted to the second framework;

FIG. 21 is a perspective view of the implement facing side of an eleventh version of an apparatus having features of the present invention, the apparatus similar to that of FIG. 9, showing added height gauge members and skids mounted to the first frame; and FIG. 22 is a flow chart depicting steps utilizing a system having features of the present invention.

DESCRIPTION

For the convenience of the reader, the following is a list of reference numbers used in this description.
- 38 Mobile machinery such as a tractor
- 40 First connecting apparatus
- 45 Rigidly-mounted base frame, also referred to a first framework
- 46 Slidably-mounted frame, also referred to as second framework
- 47 Upper crossbeam of first framework
- 48-51 Rails of first framework
- 52 Lower crossbeam of first framework
- 53 First outer stud of first framework
- 54 First inner stud of first framework
- 55 Second inner stud of first framework
- 56 Second outer stud of first framework
- 57 First sliding-frame horizontal frame sleeve, upper
- 58 Second sliding-frame horizontal frame sleeve, upper
- 59 First sliding-frame horizontal frame sleeve, lower
- 60 Second sliding-frame horizontal frame sleeve, lower
- 61 First sliding-frame vertical frame post, outer
- 62 First sliding-frame vertical frame post, inner
- 63 Second sliding-frame vertical frame post, inner
- 64 Second sliding-frame vertical frame post, outer
- 66 Rigid-frame top-link attachment, tractor facing side
- 68 Rigid-frame bottom-link attachments, tractor facing side, double plate and pin
- 78 Double wrap-around bracket clamp
- 80 Driver
- 81 Mobile machinery hydraulic pump
- 85 Hydraulic line
- 89 Hydraulic cylinder attachment housing to piston arm
- 90 Hydraulic cylinder attachment housing to cylinder housing
- 92 Hydraulic cylinder brace to rigid-frame
- 94 Hydraulic cylinder brace to sliding-frame
- 98 Pathway for a power take off ("PTO") driveline from the tractor to the implement
- 122 Adjustable mounting channel
- 122a Hole in the walls of the channel 122.
- 130 Sliding-frame Top-link hook and stop bar—also referred to as connector
- 136 Sliding-frame Bottom-link quick-hitch hook and stop bar—also referred to as connector
- 150b Entry screen
- 153b Auto Steer Device
- 236 Manual double action hydraulic valve
- 238 Automatic double action hydraulic valve
- 240 Hydraulic valve option switch
- 300 Implement, three-point attached (pushed or pulled and attached at three points allowing lifting and leveling capabilities of the implement)
- 302 Implement, towed (pulled along with a rope, chain or a drawbar)
- 318 Bottom-link arms
- 321 Tractor undercarriage
- 323 Towing coupling
- 324 Top-link arm
- 325 Towing plate, apparatus mounted
- 327 Towing pins, apparatus mounted
- 329 Holding ball bearing
- 331 Drawbar towing pin holes
- 333 Drawbar mounting bolts
- 336 Stabilizer Arms
- 337 Towing pin, implement mounted
- 339 Towing hitch coupler, implement mounted
- 341 Towing hitch arm, implement mounted
- 400 V-groove wheel
- 402 U-groove wheel
- 404 Wheel mounting-housing
- 406 Wheel axle
- 408 Wheel axle washer, bearings and grease seal
- 410 Wheel mounting-housing attachment points
- 416a and b Tracked-sliding plate assembly
- 418a and b Wheel racks
- 420a and b Plates
- 422 Towing drawbar, apparatus mounted
- 423 Towing drawbar, tractor mounted
- 424 Towing receiver hitch
- 426 Vertical rotating laser emitter
- 428 Attachment base
- 430 Laser receiver
- 432 Laser beam signal
- 434 Signal from laser receiver to controller
- 436 Controller
- 438 Sensor, second frame mounted
- 440 Sensor, first frame mounted
- 442 Signal from second frame mounted sensor to controller
- 444 Signal from first frame mounted sensor to controller
- 446 Top-bar plate
- 447 Top-bar mounting legs
- 448 GPS antenna and receiver module
- 450 Height Gauge member
- 451 Height Gauge member wheel
- 452 Height Gauge member lower arm
- 454 Height Gauge member knuckle joint
- 456 Height Gauge member adjustable upper arm
- 458 Height Gauge member angle bar
- 460 Height gauge member adjustable arm
- 462 Height gauge member skid
- 464 Height gauge member arm adjustment holes When the same reference numbers are used herein for different versions of the invention, the structures referred to are the same or similar.

Figure 5A:
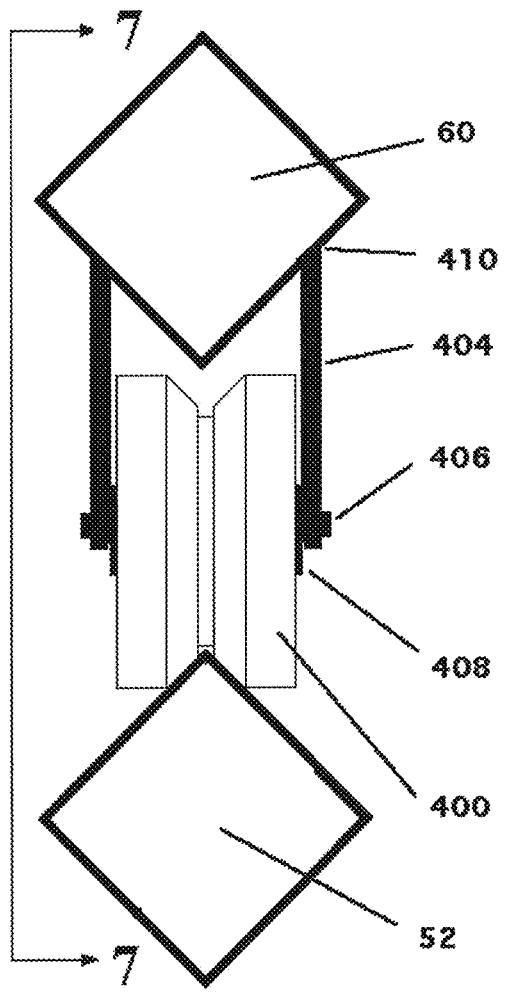
FIG. 5a is a side elevation view of V-groove wheels attached to the underside of the second framework taken on view 5a-5a in FIG. 1. (V-groove wheels rolling on the first framework lower horizontal crossbeam provides additional support for the second frame during lifting and movement applications)
Figure 5B:
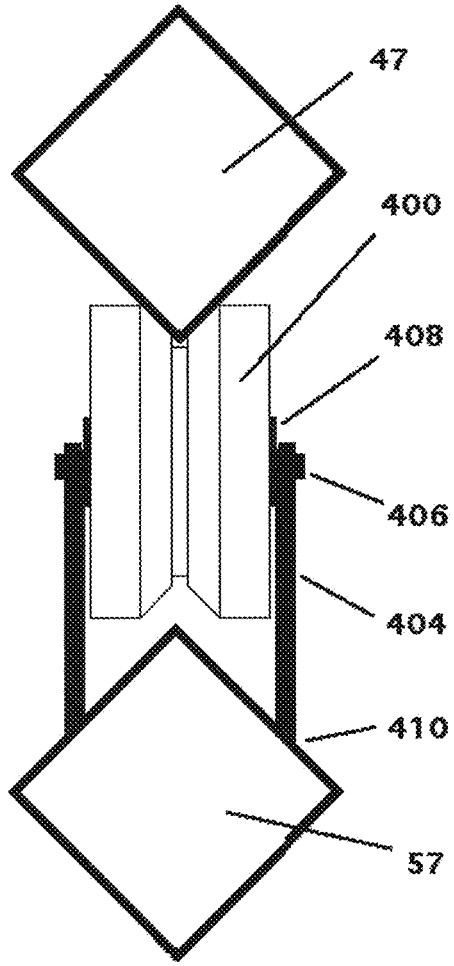
FIG. 5b is a side plan view of V-groove wheels attached to the topside of the second framework using attachment hardware allowing the wheel to roll on and be supported by the first framework, taken on view 5b-5b in FIG. 1.

The following discussion is with regard to FIGS. 1, 5a, 5b, 7, 9, and 10 which show a first connecting apparatus 40 similar to the apparatus depicted in FIG. 5 of my pending U.S. patent application Ser. No. 15/480,914. FIG. 1 shows the tractor-facing side of the connecting apparatus 40 comprising a rigidly-mounted base frame 45 (also referred to as a first framework), and a slidably-mounted frame 46 (also referred to as a second framework). The rigidly-mounted base frame 45 is configured for connection to the bottom-link arms 318 and top-link arm 324 of mobile machinery, such as a tractor 38 (see FIG. 10). Connections from the tractor 38 to the rigidly-mounted base frame 45 occur at the top link attachment 66 and at the two bottom-link attachments 68. The rigidly mounted base frame 45, also referred to as the first frame or framework, has at least two parallel, vertically spaced apart, laterally extending rails. In the version shown in FIG. 1, the first frame 45 comprises four-tiered horizontal longitudinal frame member rails 48, 49, 50, 51, which can be solid or hollow and any suitable shape in cross-section, rigidly connected at the ends to at least two vertical framework members, also referred to as studs 53-56 (four studs), and upper and lower crossbeams 47 and 52 capable of being removably secured to the three-point hitch of the tractor 38.

Preferably in the design of the rigidly-mounted base frame there are at least two upper and two lower horizontal frame members providing an opening of sufficient size between the upper and lower horizontal frame members to accommodate a Power Take Off "PTO" driveline if required for the attached implement. The PTO opening arraignment 98 is shown in FIG. 9 using a double driver configuration where the rigid frame 45 attached hydraulic cylinder brace 92 is shown. FIG. 1 also shows the rigid frame 45 attached hydraulic cylinder brace 92 and FIG. 1 also shows the sliding frame 46 attached hydraulic cylinder brace 94. The PTO opening arrangement 98 allows for the space needed for the PTO driveline to connect to an implement.

FIG. 1 shows three upper and three lower horizontal frame members for the rigidly-mounted base frame showing the rigidly-mounted base frame with six horizontal longitudinal aligned frame members, wherein frame members 47 (also referred to as upper crossbeam), 48 and 49 are in an upper position and frame members 50, 51, 52 (member 52 is also referred to as lower crossbeam), are in lower positions, and four vertical frame members. The frame members 53 and 54, are positioned to one side of the rigidly-mounted base frame and frame members 55 and 56 are positioned to the opposing side of the rigidly-mounted base frame. Members 53, 54, 55, and 56 are also referred to as studs. Members 48, 49, 50, and 51 are also referred to as rails. The laterally adjustable three-point hitch implement attachment apparatus 40 has square shaped horizontal sliding-frame members 57,58,59,60 (also referred to as sleeves) and square shaped horizontal rigid-frame members 47,48,49,50,51, and 52 oriented in a diamond shape with all sides placed at forty-five degree angles as compared to a horizontal plane. By square shaped this is with regard to a vertical cross section, and preferably they are oriented with a corner facing upwardly.

The slidable-mounted frame 46 comprises at least two horizontal longitudinally aligned hollow frame member tubes securely and sturdily connected at the ends with at least two vertical frame members forming a generally rectangular sturdy frame that is transversely and slidably-mounted on at least two horizontal longitudinal frame members, bars or rails of the rigidly-mounted base frame 45, enabling the slidable-mounted frame 46 to travel transversely, also referred to as laterally, across from one side to the other side of the rigidly-mounted base frame 45. FIG. 1 shows two upper and two lower horizontal hollow frame members for the slidably-mounted frame, wherein frame members 57 and 58 are in the upper positions and frame members 59 and 60 are in the lower positions. They slide on the rails of the base frame 45.

Shown in FIG. 1 the slidable frame 46 has four vertical frame members, two vertical frame members 61 and 62 positioned to one side, and frame members 63 and 64 positioned to the opposing side. Frame members 61-64 are also referred to as posts. Four hollow horizontal slidable-mounted frame members as opposed to two hollow horizontal slidable-mounted frame members can provide a greater load carrying capacity of the connecting apparatus.

On the rigidly mounted frame 45, the upper horizontal rigidly-mounted base frame members 48 and 49 pass through the upper slidable-mounted frame members 57 and 58. The lower horizontal rigidly-mounted base frame members 50 and 51 pass through the lower slidable-mounted frame members 59 and 60.

The slidable-mounted frame 46 is free to laterally move with respect to the rigidly-mounted base frame 45. All six rigidly-mounted base frame members and all four slidable-mounted frame members are typically vertically coplanar. While FIG. 1 and subsequent figures show a frame made from longitudinal members having a rectangular or square cross-section, it is contemplated that longitudinal members may be formed having a cylindrical cross-sectional area such as pipes or solid rods. Although FIG. 1 and subsequent figures show the square frame members turned in a diagonal horizontal position representing a diamond shape, the connecting apparatus also works in a similar fashion with the frame members turned in the square position with the bottom and top of the frame members situated in a horizontal squared position as opposed to a forty-five degree diamond slanted position when compared to a horizontal plane.

By the term "frame" or "framework" there is meant a skeletal, openwork, or structural frame.

In general, the invention comprises the first framework 45 disposed in a plane and comprising the upper crossbeam 47 and the lower crossbeam 52; the slidable second framework 46 generally in the plane of the first framework 45 to slide laterally back and forth along the first framework 45 parallel to the crossbeams 47 and 52; and one or more support members such as V-groove wheels 400 mounted on the second framework 46 for engaging the upper and lower crossbeams 47 and 52 of the first framework 45. Alternatively, the wheels 400 can be on the first framework 45 for engaging the second framework 46. The apparatus also comprises multiple attachments 66 and 68 for attaching the first framework 45 to mobile machinery such as the tractor 38, and at least one connector, and generally multiple connectors 130 and 136, for connecting the second framework 46 to an implement 300 for pulling or pushing the implement 300 by the tractor 38. The position of the top link connector 130 is adjustable being in a mounting C-channel 122 supported by bracket clamp 78, and held in place by at least one pin or bolt, and preferably at least two, mounted through holes 122a in the walls of the channel 122. The first framework 45 comprises rails 48, 49, 50, 51 and the second framework 46 comprises horizontal sleeves 57, 58, 59, 60.

Without support members the second framework would be supported against vertical loads only by the support at the ends of the rails. Likewise, without support members the second framework could lack adequate support against horizontal loads such as those from the mobile machinery and the implement.

The V-groove wheels 400 roll on the first framework 45 lower crossbeam 52 to provide additional support to the second framework 46 during lifting and movement applications. The support gained by having the V-groove wheels 400 attached to the second framework 46 and supported by the first framework 45 lower crossbeam 52 allows for increased load carrying capacity of the second framework 46. In addition to a greater load carrying capacity gain of the second framework 46, by installing the V-groove wheels 400, the rails 48, 49, 50, 51 of the first framework 45 enjoy a longer service life resulting from a reduction in wear and tear inflicted on these frame rails 48, 49, 50, 51 by the second framework 46 horizontal sleeves 57, 58, 59, 60. This reduction in wear and tear is the result of the V-groove wheels 400 supported by the first framework 45 lower crossbeam 52, therefore reducing the weight load of the second framework 46 horizontal sleeves 57, 58, 59, 60 pressing down on the first framework 45 frame rails 48, 49, 50, 51. The V-groove wheels 400 transfer a portion of the weight load on the second framework 46 to the first framework 45 lower crossbeam 52 that would otherwise be weighted on the second framework 46 and the first framework rails 48, 49, 50, 51.

Figure 7:
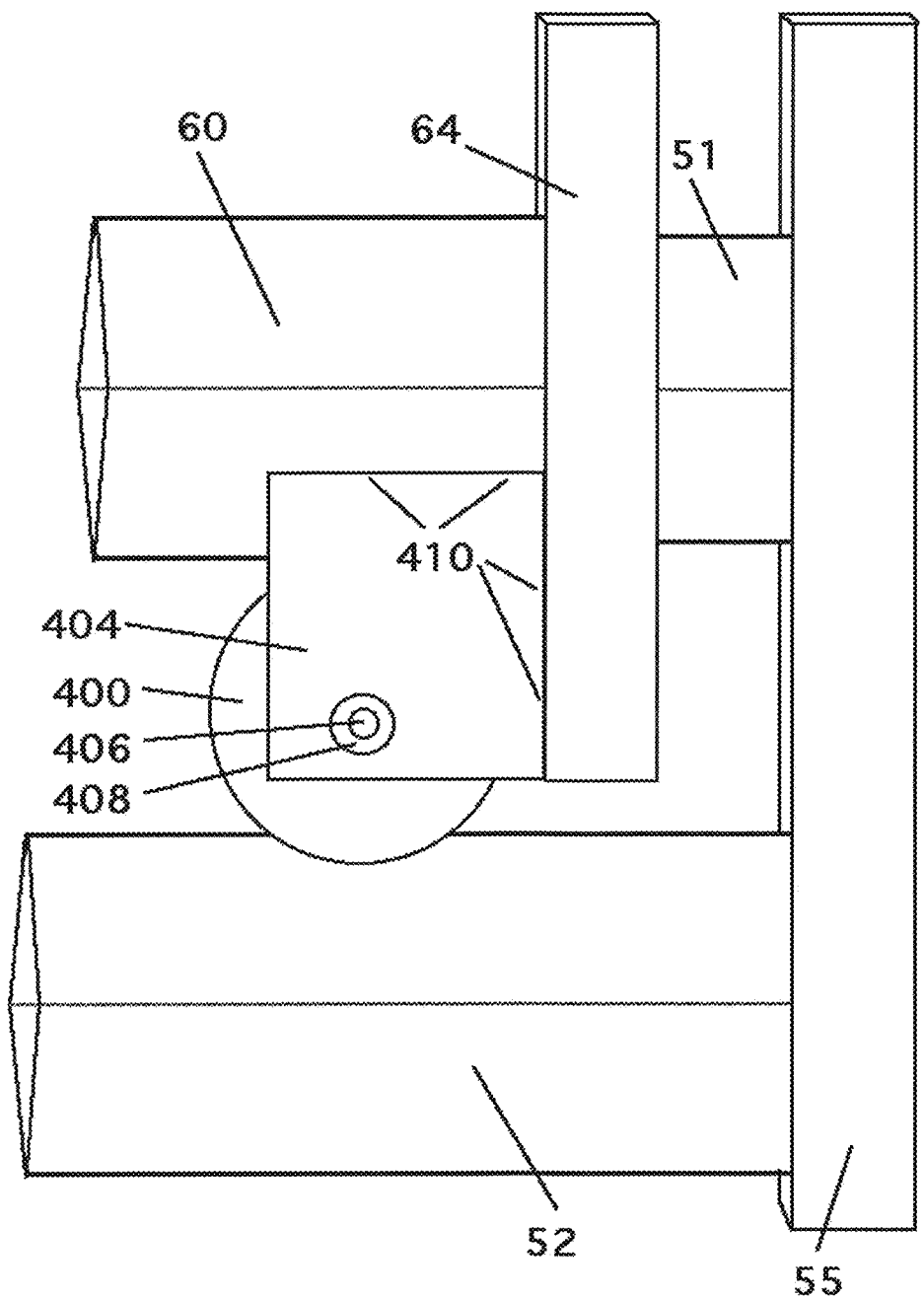
FIG. 7 is a side elevation view, taken on line 7-7 in FIG. 5a, of V-groove wheels attached to the underside of the second framework, also showing an inner stud of the first framework.

The first framework 45 lower crossbeam 52 has four support points supporting itself, two support points on the ends and two support points towards the center. The two end support points are provided by the outer studs 53 and 56 of the first framework 45 and the two centered support points are provided by the first frame 45 bottom-link attachments 68 as they attach to the bottom link lifting arms 318 of the tractor 38 (See FIG. 10). The four points of support enjoyed by the lower crossbeam 52 provide a very stable and strong platform for the second framework 46 to traverse across the first framework 45 with exceptional support and rigidity. Also shown are the two V-groove wheels 400 attached to the second framework 46 upper sleeve 57 enabling the V-groove wheels 400 to be supported and guided by the first framework 45 upper crossbeam 47 for a more complete support of the second framework 46, improving upon the second framework 46 ability to accommodate heavy pulling or pushing forces. Wheel mounting housings 404 are shown attaching the V-groove wheels 400 to the second framework 46 upper sleeve 57 and also to the second framework 46 lower sleeve 60. FIGS. 5a, 5b, and 7 show only a portion of the housing 404, which can comprise four side walls.

Figure 10:
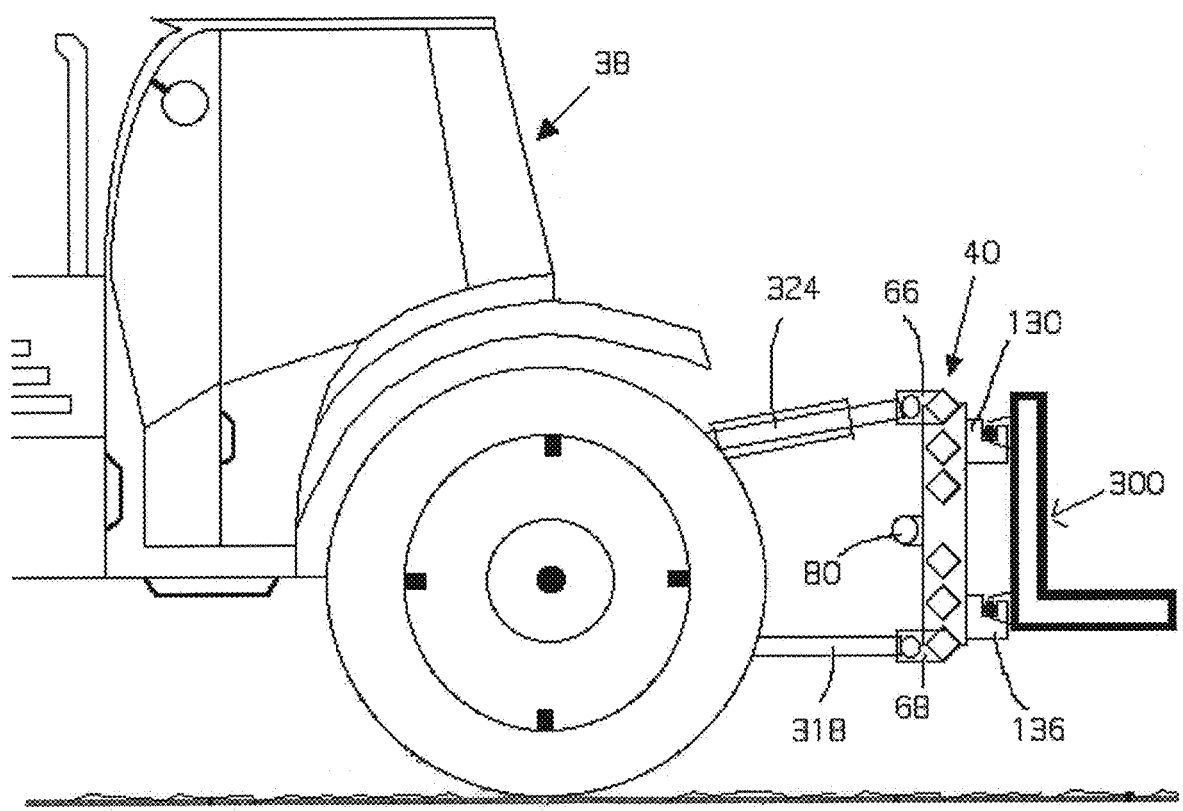
FIG. 10 is a side view of a tractor as a mobile machinery with the connecting apparatus of FIG. 1 connecting an implement to the tractor.

The first frame 45 is configured for connection to the bottom-link arms 318 (See FIG. 10) and top-link arm 324 (See FIG. 10) of the mobile machinery, such as the tractor 38 (See FIG. 10). Connections from the tractor to the first framework 45 occur at the top link attachment 66 and at the two bottom-link attachments 68. The first framework 45 can have at least two parallel, vertically spaced apart, laterally extending rails 49 and 50. In the version shown in FIG. 1, the first frame 45 comprises three upper and three lower horizontal framework members, namely six horizontal longitudinal aligned frame members, which can be solid or hollow or any suitable shape in cross-section, rigidly connected at the ends to at least two vertical framework members 53 and 56, also referred to as studs. The first frame member comprises four tiered horizontal longitudinal frame rails 48, 49, 50, 51, and upper 47 and lower 52 cross beams. The first frame 45 is capable of being removably secured to the three-point hitch of the tractor 38 at the top link attachment 66 and at the two bottom-link attachments 68.

Preferably included in the first framework 45 are four vertical framework members, namely first outer stud 53, second outer stud 56, first inner stud 54, and second inner stud 55. First framework 45 members 53 and 54 are positioned to one side of the first framework 45 and framework members 55 and 56 are positioned to the opposing side of the first framework 45. The laterally adjustable three-point hitch implement attachment apparatus 40 is shown using square shaped horizontal sliding-frame members 57, 58, 59, and 60 (also referred to as sleeves) and the square shaped horizontal first framework 45 members 47, 48, 49, 50, 51, 52 oriented in a diamond shape with all sides placed at forty-five degree angles as compared to a horizontal plane and a corner uppermost. By square shaped this is with regard to a vertical cross section and preferably they are oriented with a corner facing upwardly. The second framework 46 comprises at least two horizontal longitudinally aligned hollow frame member tubes securely and sturdily connected at the ends with at least two vertical frame members forming a generally rectangular sturdy frame that is transversely and slidably-mounted on at least two horizontal longitudinal frame members, bars or rails of the rigidly-mounted base frame 45, enabling the second framework 46 to travel transversely, also referred to as laterally, across from one side to the other side of the first framework 45. FIG. 1 shows two upper and two lower horizontal hollow framework members for the slidably-mounted frame, wherein framework members 57 and 58 are in the upper positions and frame members 59 and 60 are in the lower positions. The second framework 46 members slide on the rails of the first framework 45. Shown in FIG. 1 are four vertical framework members, two vertical framework members 61 and 62 are positioned to one side and framework members 63 and 64 are positioned at the opposing side. Framework members 61, 62, 64, 64 are also referred to as posts. Four hollow horizontal second framework 46 sleeves 57, 58, 59, 60 as opposed to two hollow horizontal second framework 46 sleeves can provide a greater load carrying capacity of the connecting apparatus.

The upper horizontal first framework 45 rails 48 and 49 pass through the upper second framework 46 sleeves 57 and 58. The lower horizontal first framework 45 rails 50 and 51 pass through the lower second framework 46 sleeves 59 and 60. The second framework 46 is free to laterally move with respect to the first framework 45. All six first framework 45 members and all four second frame 46 members are typically vertically coplanar. While FIG. 1 and subsequent figures show the frames made from longitudinal members having a rectangular or square cross-section, it is contemplated that longitudinal members can be formed having a cylindrical cross-sectional area such as pipes or solid rods or other suitable shape.

The driver 80 can be at least one hydraulic cylinder or at least one electric linear actuator. At least one driver, and for a robust apparatus, two drivers, are connected to the first framework and the second framework for driving the slidable framework laterally back and forth along the rails. In use of the apparatus, the position of the implement relative to the mobile machinery is changed by the action of the driver, the driver laterally moving the second framework. The driver 80 fluid can be provided by a hydraulic line 85. The driver 80 can be in the plane of the frameworks, or as shown in the version of FIG. 1, outside of the plane of the frameworks, extending toward the tractor 80.

Connectors for connecting the second framework 46 to the implement 300 can be hooks, an upper hook 130 and bottom hooks 136, each supported by a wraparound bracket clamp 78.

FIG. 2 is a perspective view of the mobile machinery facing side of an apparatus 40 similar to that of FIG. 1 showing a first wheel rack 418a mounted on the second framework 46 upper sleeve 57, enabling the second framework 46 to roll on and be supported by the first framework 45 upper crossbeam 47. A second wheel rack 418b is mounted on the lower sleeve 60 of the second framework 46 enabling the second framework 46 to roll on and be supported by the lower crossbeam 52 of the first framework 45. The bottom wheel rack 418b can be constructed to handle a higher weight load than the top wheel rack 418a since the bottom second framework 46 lower sleeve 60 supports the bottom link hooks 136 (See FIG. 9). These hooks, also referred to as connectors, support the majority of the weight of the attached implement 300 (see FIG. 10). Each wheel rack 418 has multiple wheels in the rack as compared to single wheels in the version shown in FIG. 1.

Both the top wheel rack 418a and the bottom wheel rack 418b can be constructed using V-groove wheels 400 (see FIG. 5a), U-groove wheels 402 (see FIG. 6a), or other similar suitable design to allow the second frame 46 to resist lateral pulling forces as the apparatus 40 is used in heavy pushing or pulling applications. If implement attachment hook clamps 78 (see FIG. 9) interfere with the wheel racks 418 attachment to the second frame 46, implement attachment hook housings 78 can be welded on to the second frame 46 implement side of the apparatus 40, thereby avoiding the clamp around style of the implement attachment clamps 78 (see FIG. 9).

Figure 3:
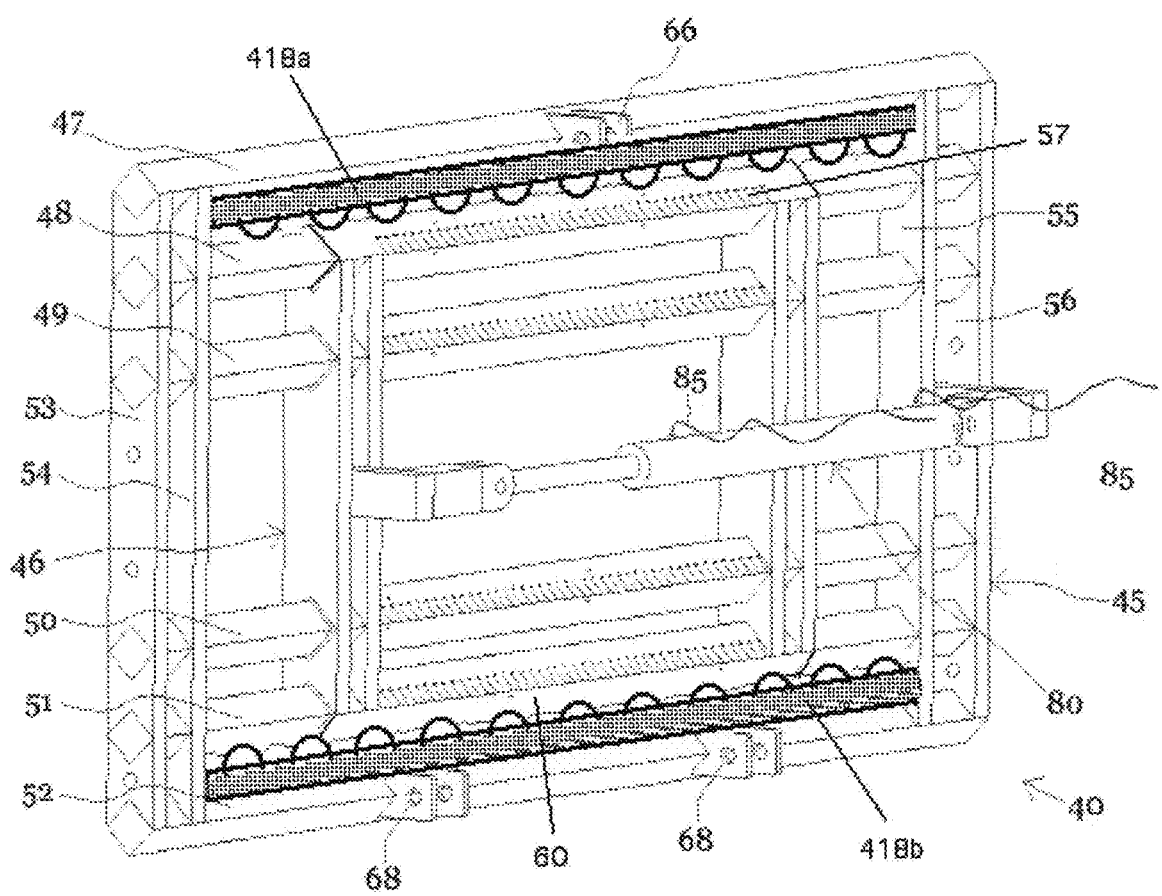
FIG. 3 is a perspective view of a mobile machinery facing side of a third version of an apparatus having features of the present invention similar to that of FIG. 1, showing top and bottom wheel racks mounted on crossbeams of the first framework, allowing the wheels to roll on top and bottom sleeves of the second framework.

FIG. 3 is a perspective view of the mobile machinery facing side of an apparatus 40 similar to that of FIG. 2, differing in the wheel rack is attached to the first frame rather than the second frame. The upper wheel rack 418a is mounted on the upper crossbeam 47 of the first framework 45 enabling the second framework 46 upper sleeve 57 to roll on and be supported by the upper wheel rack 418a. The lower wheel rack 418b is mounted on the lower crossbeam 52 of the first framework 45 enabling the second framework 46 lower sleeve 60 to roll on and be supported by the wheel rack 418b. The lower wheel rack 418b can be constructed to handle a higher weight load than the top wheel rack 418a since the bottom second framework 46 lower sleeve 60 supports the bottom-link hooks 136 (See FIG. 9); these hooks support the majority of the weight of the attached implement 300 (see FIG. 10). Both the top wheel rack 418a and the bottom wheel rack 418b can be constructed using V-groove wheels 400 (see FIG. 5a), U-groove wheels 402 (see FIG. 6a), or other similar suitable design to allow the second frame 46 to resist front or rear pushing or pulling forces as the apparatus 40 is used in heavy pushing or pulling applications. If implement attachment bracket clamps 78 (see FIG. 9) would interfere with the wheel racks 418 as they are attached to the first frame 45, implement attachment hook clamps 78 can be welded on to the second frame 46 implement side of the apparatus 40, therefore avoiding the clamp around style of the implement attachment bracket clamps 78 (see FIG. 9).

Figure 4:
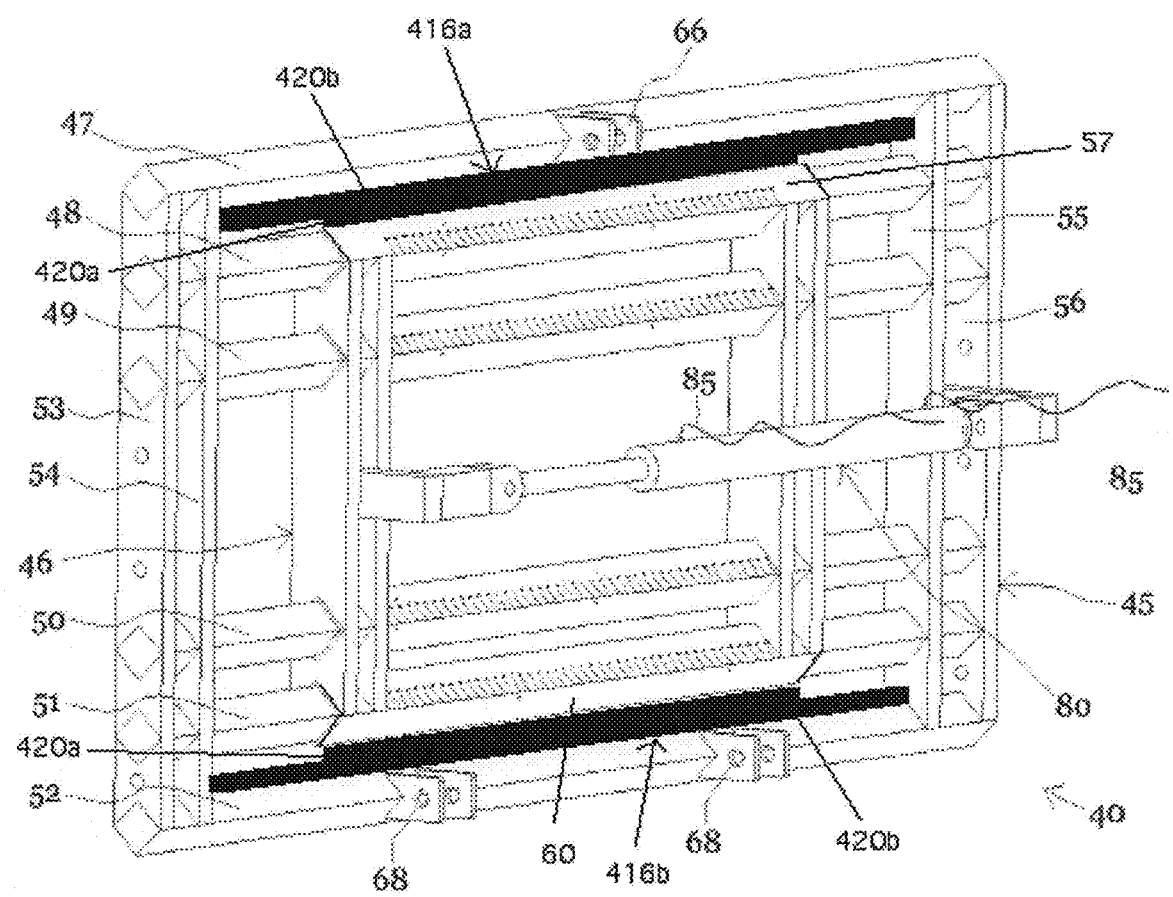
FIG. 4 is a perspective view of a mobile machinery facing side of a fourth version of an apparatus having features of the present invention, similar to that of FIG. 1, showing top and bottom slide plate systems.

FIG. 4 is a perspective view of a fourth version of an apparatus 40 according to the present invention, showing the mobile machinery facing side of the apparatus 40 similar to that of FIG. 1, utilizing upper and lower sliding rack assemblies 416a and b, respectively, as the support members instead of wheels. Each rack assembly 416a and b comprises two plates 420a and b, typically made of a material having structural strength and a low coefficient of friction, such as nylon or metal. A lubricant can be used. The upper sliding plate assembly 416a comprises an upper plate 420a mounted on the first framework 45 upper crossbeam 47 and a lower plate 420b mounted on the second framework 46 upper sleeve 57, the upper plate 420a being longer than the lower plate 420b. The second framework 46 upper sleeve 57 slides on and is supported by the upper rack 420a. The sliding plate assembly 416b has plate 420a mounted on the lower crossbeam 52 of the first framework 45, and 420b plate mounted on the bottom sleeve 60 of the second framework 46. The lower sliding plate assembly 420b can be constructed to handle a higher weight load than the top sliding plate assembly 416a since the lower first frame lower sleeve 60 supports the bottom link hooks 136 (See FIG. 9), these hooks support the majority of the weight of an attached implement.

It is possible to use different types of support members in a single apparatus, such as using a sliding plate assembly for the upper cross beam and wheels for the lower cross beam.

Figure 8:
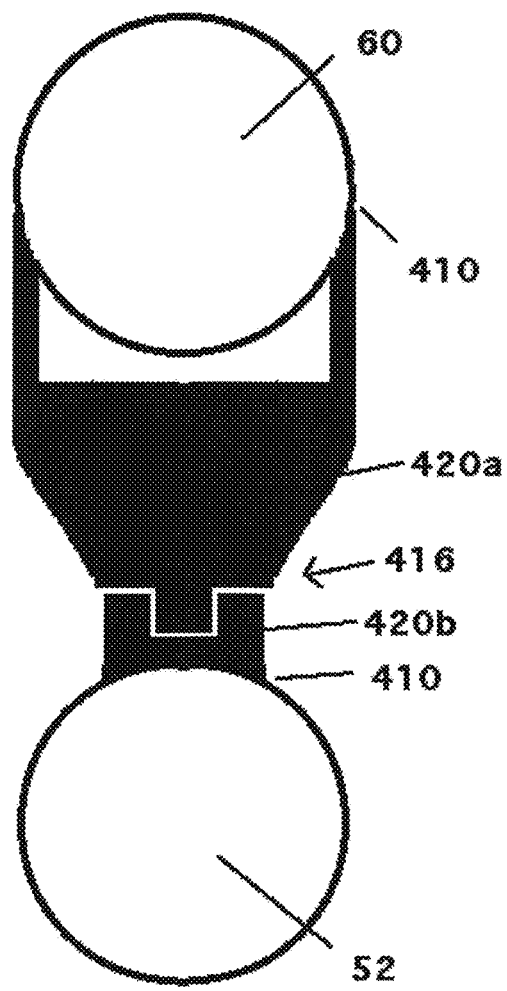
FIG. 8 is a schematic view of use of a tracked sliding plate system.

FIG. 8 shows a specific example of a sliding plate assembly 416b being used with the lower crossbeam 52, which can also be used with the upper crossbeam 47 or with both crossbeams. The sliding plate assembly 416b comprises notched plate 420a mounted to the lower crossbeam and plate 420b mounted on the lower sleeve 60 of the second framework, the plate 420b having a protrusion that fits into the notch of the notched plate 420a to provide horizontal support. The position of the plates 420a and 420b can be reversed with the notched plate 420a on the lower sleeve 60 with plate 420b with the protrusion mounted on the lower crossbeam 52. This sliding plate assembly 416 increases the stability and weight handling capacity of the second framework 46 of the apparatus 40. As shown in FIG. 8, both the sliding plate 420b and the notched sliding plate 420a can have other similar suitable designs to allow the second frame 46 to resist front or rear lateral forces as the apparatus 40 is used in heavy pushing or pulling applications. If implement attachment hook clamps 78 (see FIG. 6) interfere with the plates as they are attached to the first frame 45, the implement attachment hook brackets can be welded on to the second frame 46 implement side of the apparatus 40, thereby avoiding the clamp around style of the implement attachment clamps 78.

FIGS. 5a and 7 show use of V-groove wheels 400, supported in a housing 404 on an axle 406 with grease seals 408. The housing 404 is attached to the underside of the lower sleeve 60 of the second framework 46. The V-groove wheels 400 rest and roll on the lower horizontal crossbeam 52 of the first framework 45 during operation and provide additional support to the second framework 46 during lifting and movement applications. The housing 404 is attached at location 410 to the lower sleeve 60 of the second framework 46. Preferably the attachment is structurally strong such as by welding. The housings 404 for the wheels preferably are constructed of a sturdy material to support a great amount of weight.

FIG. 5b is similar to FIG. 5a but for the upper cross beam 47. In particular, the V-groove wheels 400 are attached to the topside of the upper sleeve 57 of the second framework 46. In FIG. 5b the V-groove wheels 400 are supported by and roll on the upper horizontal crossbeam 47 of the first framework 45 during operation of the second framework 46, providing additional support to the second framework 46 during lifting and movement applications.

Figure 6A:
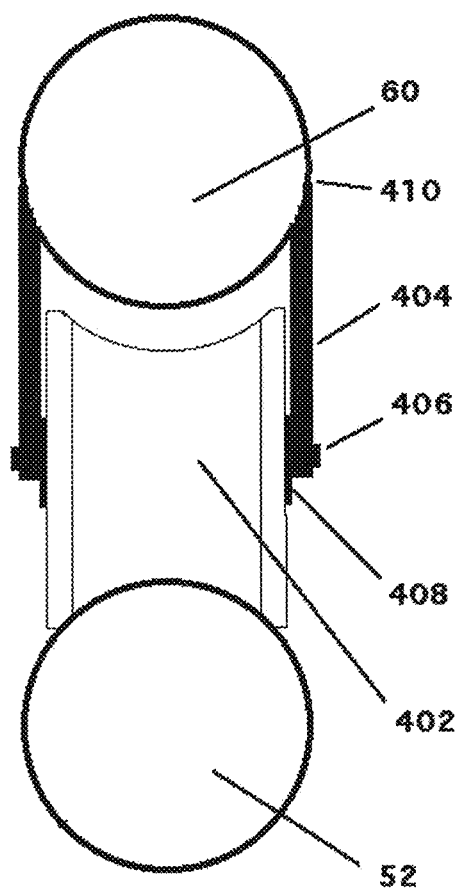
FIG. 6a is a side elevation view, similar to that of FIG. 5a, of U-groove wheels attached to the underside of the second framework.
Figure 6B:
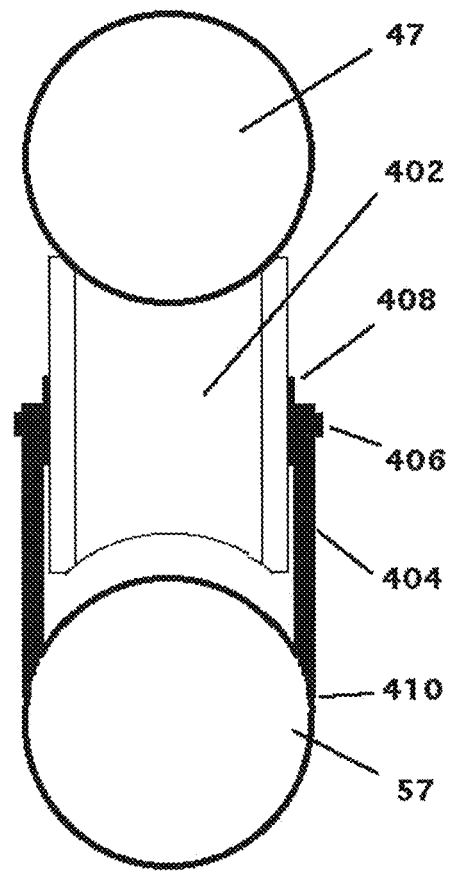
FIG. 6b is a side elevation view, similar to that of FIG. 5b, of U-groove wheels attached to the topside of the second framework.

The support member and the structure shown in FIGS. 6a and 6b are substantially the same as those in FIGS. 5a and 5b, differing only in that the wheels 402 are U-groove wheels 402 rather than V-groove wheels 400. A single connecting apparatus can have both U-groove wheels and V-groove wheels.

FIG. 7 shows a side view of V-groove wheels 400 attached to the underside of the lower horizontal frame sleeve 60 of the second framework 46. V-groove wheels 400 are supported by and roll on the first framework 45 lower horizontal crossbeam 52 during operation of the second framework 46, providing additional support to the second framework 46 during lifting and movement applications. The wheel mounting-housings 404 are constructed of a sturdy material to support a great amount of weight such as in the case of agricultural implement operations. Wheel mounting-housing attachment points 410 are rigidly attached in a process such as welding or other permanent attachment. Wheel axle 406 and wheel axle washers, bearings and grease seals 408 are mounted and constructed of high strength materials such as steel. Wheel mounting-housings 404 can be welded on two sides for additional strength, one side attached to the lower horizontal frame sleeve 60 second framework 46, and the adjoining side attached to the outer sliding-frame vertical frame post 64 (see FIG. 1). Removal of the wheel with V-groove wheels 400 can be achieved by removing the wheel axle 406 and sliding out of the open end between the wheel mounting housings 404. The second framework 46 sleeve 60 slides over the first framework rail 51. First framework inner stud 55 is shown as it connects to the first framework lower crossbeam 52.

The placement and design of the wheels or the sliding devices can vary as required by each application. Heavier applications may require more wheels or sliding devices in a more closely arranged design as compared to lighter weight applications.

Figure 11:
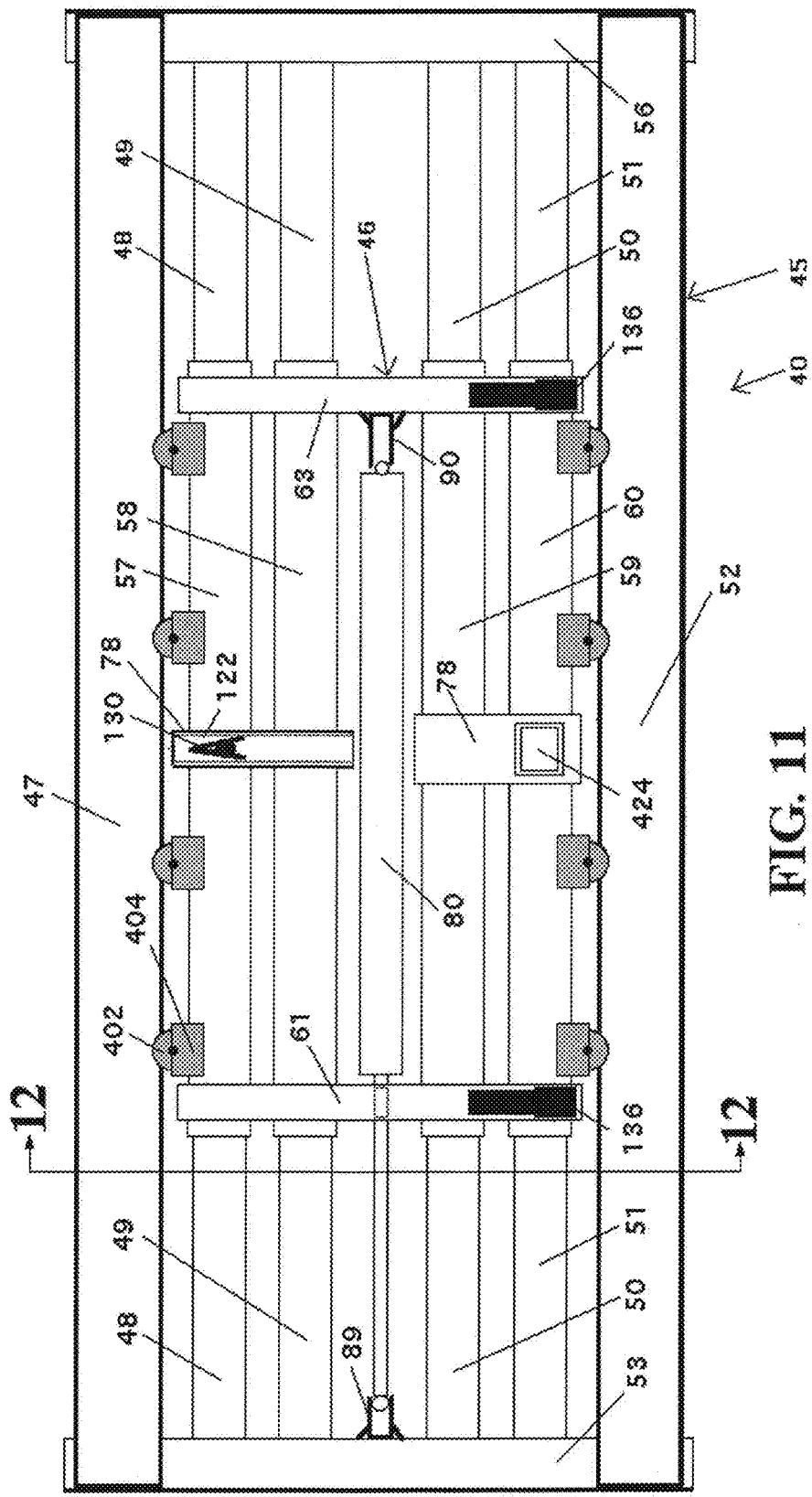
FIG. 11 is a rear elevation view of the implement facing side of a fifth version of an apparatus having features of the present invention, similar to the apparatus of FIG. 1 with added support wheels, round frame members, and a driver positioned in the same plane as the first and second frameworks.
Figure 12:
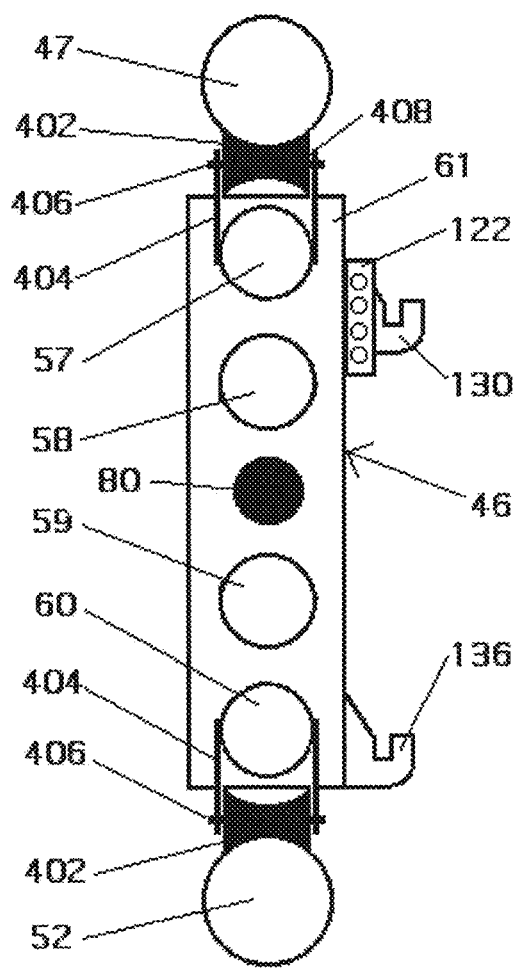
FIG. 12 is a partial sectional view of the apparatus of FIG. 11 taken on line 12-12 In FIG. 11.

With reference to FIG. 11, a fifth version of an apparatus 40 having features of the present invention, is similar to the apparatus of FIG. 1. One difference is the driver 80 is located generally in the same plane as the first framework 45 and the second framework 46 instead of outside of the first framework 45 and second framework 46 planes as shown in FIG. 1. The driver is supported at one end by a bracket 89 to the first framework and at its other end by a bracket 90 to the second framework. The driver 80 in FIG. 11 is positioned generally in the second framework 46 plane and moves with second framework 46 as the second framework 46 moves laterally across the first framework 45.

A second difference is this apparatus 40 is shorter than the apparatus 40 of FIG. 1, allowing for a more compact design.

A third difference is a lower positioned double wrap around bracket clamp 78 is attached to the lower second frame 46 sleeves 59 and 60 for supporting a towing receiver hitch 424. The hitch 424 can be used in a towed implement application instead of a three-point hitch implement application.

A fourth difference is the bottom hooks 136 used for connection to the implement are welded to a respective one of the posts 61, 63 of the second framework, and unlike the top hook 130, are not vertically adjustable. If desired, all hooks can be vertically adjustable.

Figure 13:
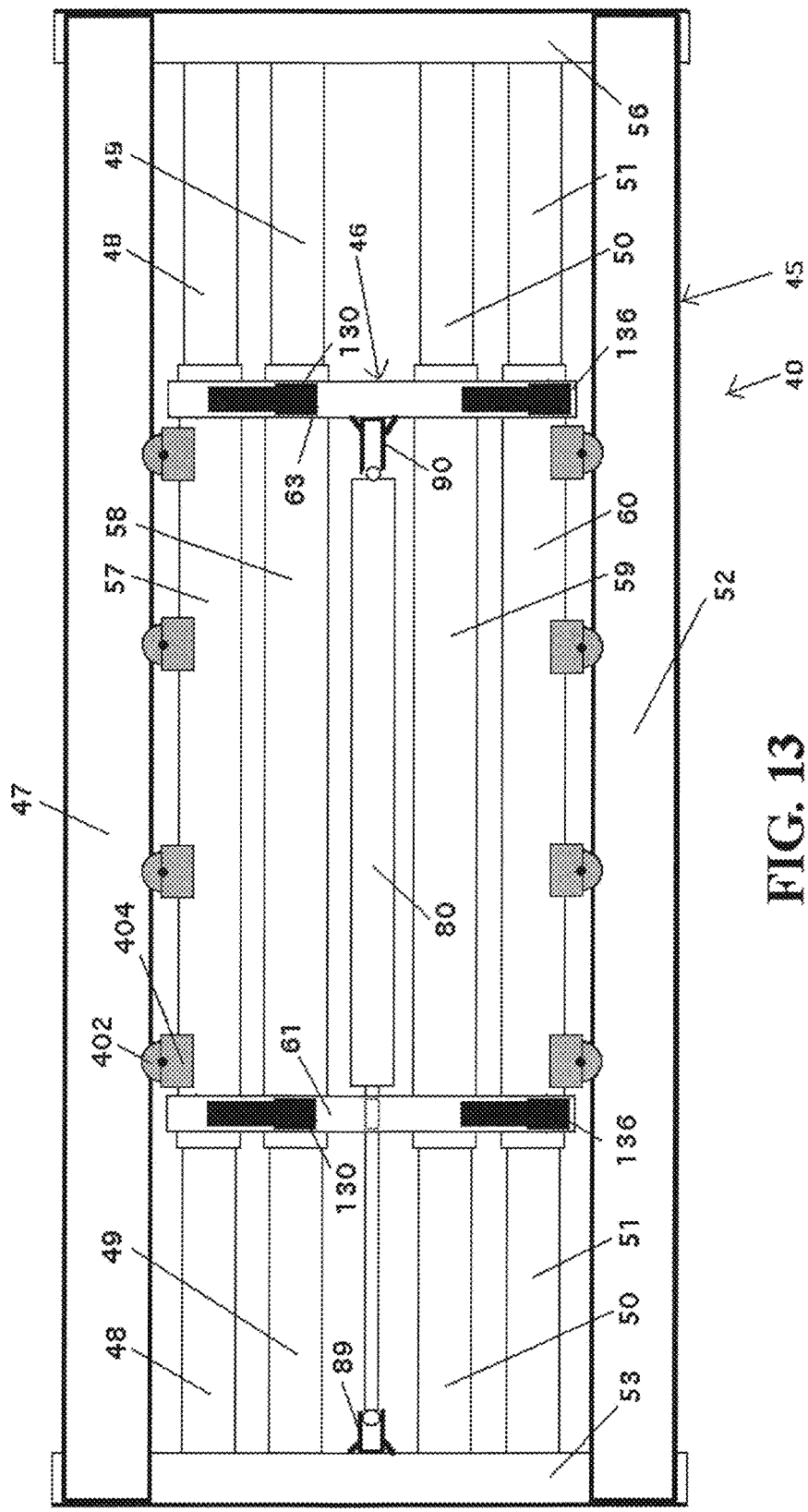
FIG. 13 is a rear elevation view of the implement facing side of a sixth version of a connecting apparatus having features of the present invention, showing a four-point connection to an implement as opposed to a three-point connection to an implement as shown in FIG. 11.

FIG. 13 is a rear view of the implement facing side of an apparatus 40 similar to that of FIG. 11. showing a four-point connection to an implement as opposed to a three-point connection to an implement shown in FIG. 11. Top-link connectors 130 are mounted on the upper portion of the second framework 46 vertical end posts 61 and 63 in a four-point configuration when combined with the two lower bottom link connectors 136 attached at the lower portion of the second framework 46 vertical end posts 61 and 63. The width spread for the four-point connectors 130 and 136 can be a standard width and height measurement for implement attachments in an industry such as the agricultural industry.

FIG. 14 includes the features of the version of FIG. 1 using a view similar to that of FIG. 9 with the following differences. First, a towing drawbar 422 projecting from a bracket clamp 78 secured to bottom sleeves 59 and 60 replaces the three-point attachment configuration attached to the second framework 46. In a clamp mounting alternative for the towing drawbar 422, the double wrap-around clamp 78 can be split in half while using only one side of the clamp to permanently attach the clamp to the lower sleeves 59 and 60 of the second framework 46 using an attachment method such as welding.

Unlike a version of a three-point attachment of the implement is fixed relative to the position of the second framework, because a towing drawbar 422 is used, the position of the implement is not fixed relative to the position of the second framework. Accordingly, the second difference is multiple sensor systems are used to determine the position of the implement so it can be laterally moved by the driver to stay on track. Signals outputted by the sensor systems are provided to a controller 436 for controlling the lateral position of the implement being towed.

Each position sensor system can be any system that determines position. The position sensing system comprises a signal generator and a signal receiver that generates an output signal. The position sensing system can be a GPS system. Exemplary of different types of sensor are capacitive transducers, capacitive displacement sensors, eddy-current sensors, ultrasonic sensors, grating sensors, Hall effect sensors, inductive non-contact position sensors, optical laser Doppler vibrometers, linear variable differential transformers, photodiode arrays, piezo-electric transducers, potentiometers, optical proximity sensors, and string potentiometers. For example, the signal generator can be a laser on the first framework and the signal receiver can be a linear array of receivers on the second framework, wherein the receiver that receives a laser beam from the laser generates an output signal that indicates the position of the second framework relative to the laser, and thus relative to the first framework.

In a preferred version, a first sensing system can be a GPS antenna and receiver module 448, also referred to as a GPS receiver system, mounted on the second framework 46 for determining the absolute geographical location of the second framework 46. The GPS module 448 communicates the second framework position to the controller 436 as a first data input. Top-bar plate 446 supports the GPS antenna and receiver module 448. The top bar plate 446 and mounting legs are attached to the second framework 46.

Second, a signal generator 438 on the second framework 46 and a receiver 440 on the first framework 45, respectively, communicate with the controller 436 to relay a signal indicating the relative position of the frameworks to the controller 436 as a second data input. The controller determines their relative position.

Third, a local position sensing system is used. By "local" there is meant that the system uses components interacting with each other where the components are on the first framework and the implement rather than using remote signals such as used with GPS systems. For example, a signal emitting device such as a vertical rotating laser emitter 426 is mounted on an attachment base 428 attached to the first framework 45 upper crossbeam 47. The emitter 426 emits a laser beam signal 432 communicating to a signal receiving device such as a laser receiver 430 mounted on the working portion of the implement 302. The laser receiver 430 emits a signal 434 in a wired or wireless configuration to the controller 436 as the third data input. This allows determination of the position of the implement relative to the first framework 45. Optionally the emitter 426 can be on the implement and the receiver 430 can be on the first framework.

The controller 436 comprises a processor, data memory, a signal receiver, and a signal generator. Based on these three data inputs, the controller 436 can determine the absolute geographic position of the towed or pushed implement since the controller receives the absolute position of the second framework, the relative position of the two frameworks, and the relative position of the implement to the first framework. This avoids the need for a GPS receiver system on the implement. Instead each implement has a simple laser receiver, which can be moved from implement to implement.

The controller 436 has stored in memory a desired path for the implement, which can be preprogrammed by the user. The controller compares the actual determined location of the implement to the desired path, and when the implement is off path, sends a signal to the driver 80 to laterally move the second framework so the implement moves to the desired path.

The controller 436 can also communicate with a tractor steering device to automatically steer the tractor assisting in the repositioning of the implement 302 (see FIG. 18*a*) to a predetermined path.

Optionally, other appropriate signaling and receiving devices can be used to replace the laser emitter 426 and the laser receiver 430. Some of these other replacement devices can be digital emitters and receivers, radio wave emitters and receivers, mechanical versions or other devices to accomplish the same result of measuring the position of the working portion of the implement as compared to the first framework 45.

FIG. 15 is a perspective view of the implement facing side of an apparatus 40 similar to that of FIG. 14 showing a towing receiver hitch 424 in place of the towing drawbar 422 mounted on the second framework 46 sleeves 59 and 60. The towing receiver hitch 424 allows the attachment of a variety of towing attachment devices such as drawbar, pintle eye, ball or other suitable towing devices. Suitable towing devices are inserted into the towing receiver hitch 424 and secured in place with a pin thru the hole in the towing receiver hitch 424. The towing receiver hitch 424 can be attached to a double wrap-around clamp 78 for towing implements as opposed to a three-point connection that lifts implements. In a clamp mounting alternative for the towing receiver hitch 424, the double wrap-around clamp 78 can be split in half while using only one side of the clamp to permanently attach the clamp to the lower sleeves 59 and 60 of the second framework 46 using an attachment method such as welding.

With reference to FIG. 16, a mobile machinery facing side of an apparatus 40 similar to that of FIG. 2 has an added towing coupling 323 comprising a towing plate 325 with attached, depending towing pins 327. Towing pins 327 engage the tractor drawbar 423 (see FIG. 17) to improve the towing ability of the apparatus 40 while also relieving stress on the tractor three-point hitch (see FIG. 17) during the towing of heavy loads and navigating stressful turning angles. The towing plate 325 with towing pins 327 attached in effect extends the tractor mounted drawbar 423 (see FIG. 17) to the first frame 45 of the apparatus 40, thereby preventing or diminishing a horizontal twisting action that can stress the three-point hitch and especially on the three-point hitch stabilizer arms 336 (see FIG. 17) The towing plate 325 can be rigidly attached to the first frame 45 lower crossbeam 52 with an attachment method such as welding. Towing pins 327 can be attached to the towing plate 325 by installing them through holes in the towing plate 325 and temporarily or permanently securing in place, or in a less preferred alternative, welding the pins directly to the towing plate 325. Holding ball bearings 329 can be built into the towing pins 327 to allow the towing pins 327 to maintain a secured connection to a tractor mounted drawbar 423 (see FIG. 17) unless a strong force is applied upwards to release the towing pins from the tractor mounted drawbar 423 In such an instance the three-point hitch is raised to remove the towing pins 327 from the tractor mounted drawbar 423. The release of the towing pins 327 from the tractor drawbar prevents the rising force of the apparatus 40 from bending the tractor drawbar while the three-point hitch raises the apparatus 40.

FIG. 17 shows a prior art three-point hitch arrangement with its various parts attached including a tractor mounted drawbar 423 designed for towing an implement 302 (see FIG. 18*a*). The drawbar 423 displayed in this drawing is a relatively wide drawbar in the general width of around six inches. Many tractor mounted drawbars 423 are generally in the width of around three to six inches. The drawbar 423 is usually removably secured to the tractor undercarriage 321, usually with bolting hardware 333. Top link arm 324 is shown along with two bottom link lift arms 318 to complete the three points of the three-point hitch. Holes 331 in the end of the drawbar are available to hookup an implement or in this case of the present invention, to hookup to the towing plate pins 327 (see FIG. 16) that in effect, extends the drawbar to the apparatus 40 (see FIG. 16) first frame 45 (see FIG. 16).

FIG. 18*a* is a side elevation view of a tractor 38 towing an implement 302 with the apparatus 40 attached to the tractor three-point hitch top link arm 324, two bottom link arms 318, and the implement 302 attached to the sliding frame of the apparatus 40. Bottom link arms 318 connect to the apparatus at location 68 while the top link arm 324 connect to the apparatus 40 at location 66, driver 80 is shown. Apparatus 40 towing coupling 323 of FIG. 16 is attached to the apparatus 40 lower crossbeam 52 and shown with towing plate pins 327 attached to the towing plate 325 and removably protruding through the tractor drawbar 423. Apparatus 40 attached drawbar 422 is shown connecting to the implement 302 towing hitch coupler 339 using towing pin 337 for removable and pivoting attachment. Towing hitch arm 341 spans a distance between the tractor 38 and the implement 302 to allow for a tight turning radius. Top bar plate 446 is mounted to the top bar mounting legs 447 that are mounted to the second frame 46 and supports the mounting of a GPS antenna and receiver module 448 to enable the controller 436 to identify the position of the second frame 46. A vertical rotating laser emitter 426 is mounted on the first frame 45 upper crossbeam 47 of the apparatus 40. Laser signal 432 is received by the laser signal receiver 430 mounted on the towed implement 302 which in turn identifies the location of the towed implement 302 enabling the controller 436 to make needed adjustments of the towed implement 302 position.

FIG. 18*b* is a close-up view of a portion of FIG. 18*a* showing the tractor drawbar 325, apparatus 40 towing plate 325, towing plate pins 327 forming the towing coupling 323, holding ball bearing 329 and implement towing hitch arm 341 with attached towing hitch coupler 339 held in place by towing pin 337.

FIG. 19 is a perspective view of the implement facing side of the apparatus 40 similar to the apparatus of FIG. 1 showing two height gauge members 450 and height gauge member wheels 451 mounted to the outer studs 53 and 56 of first frame 45 using a height gauge member 450 lower adjustment arm 452 attached to knuckle joint 454 that is attached to adjustable upper arm 456. Height gauge member 450 angle bar 458 is shown attached to the height gauge member 450 upper and lower arm 456 and 452 for adjusting the angle and height of the attached wheel 451. Height gauge member 450 adjustable upper arm 456 is shown with arm adjustment holes 464. The height gauge member 450 allows the mobile machinery operator to gauge the height of the apparatus 40 and the attached height of an three-point implement 300 (see FIG. 10)

FIG. 20 is a perspective view of the implement facing side of the apparatus 40 similar to the apparatus of FIG. 15 showing two height gauge members 450 with height gauge member wheels 451 attached to the apparatus 40 second frame 46 vertical frame posts 61 and 63. Also shown is height gauge member 450 arm adjustment holes 464 attaching the height gauge adjustable arm 460.

FIG. 21 is a perspective view of the implement facing side of an apparatus similar to the apparatus of FIG. 9 showing added height gauge member 450 with height gauge member skids 462 mounted to the first frame 45 outer stud 53 and outer stud 56. Adjustable arm 460 is shown with adjustment holes 464. The height gauge member skids 462 are useful in some situations in the place of wheels for height adjustment and height support that compliments the three-point hitch height support. The height gauge member skids 462 can be useful in determining where to place the apparatus 40 above grade height to place an implement 300 (see FIG. 10) at a desired height. The tractor operator may need to stop the height gauge member skid 462 at a height of ½ inch above grade for a desired implement position during use. The visualization of the height gauge member skids 462 at ½ inch above grade makes this task very simple, especially when repetition of the implement height adjustment is required as in the lifting of the implement to turn around at the end of a farming row many times over. In the alternative to height gauge member wheels 451, the height gauge member skids 462 can better support the apparatus 40 in a situation of very soft dirt where a large square skid pad can be useful in reducing the pounds per square inch of weight on the skid caused by the attached implement 300 (see FIG. 10) when the optimal use of the skid 462 is to drag the skid 462 along the grade for correct height placement of the implement 300 (see FIG. 10).

With reference to FIG. 22, an engine power unit of mobile machinery such as the tractor 38 powers a hydraulic pump 81, which is normally used for controlling the three-point hitch link arms 318 and 324 (see FIG. 17) and utilizes a fluid reservoir. Hydraulic fluid powers the hydraulic driver 80. A hydraulic valve option switch can be toggled between manual and automatic. If the hydraulic valve option switch 240 is in the automatic position, the automatic double action hydraulic valve 238 controls the driver 80. If the hydraulic valve option switch 240 is in the manual position, the automatic double action hydraulic valve 238 does not receive hydraulic fluid and is not operational, and thus the manual double action hydraulic valve 236 controls the driver at the tractor operator's initiation.

A guidance signal is received by the receiver 448 which is connected to the controller 436. An antenna is optionally provided to enhance the reception of the guidance signal to the receiver 448, but not required for a laser receiver in place of a GPS receiver. The driver controller 436 transmits a signal to the automatic double action hydraulic valve 238 to control the driver 80.

The mobile machinery has a battery and generator which provide power to the controller 436 and signal receiver 448. The sensors 438 and 440 detect the position of the first frame 45 relative to the second frame 46 and relays the information to the controller 436. Auto steer device 153b is controlled by the controller 436 to steer the mobile machinery. Data and data entry screen 150b is provided for a visual picture of the components actions and a portal for data entry to set parameters for the systems operation.

The control of a three-point implement 300 (see FIG. 10) is a slightly easier task than the control of a towed implement 302 (see FIG. 18a). During the control of the three-point implement 300, the GPS receiver is mounted on the second frame 46 as also the three-point implement 300 is mounted. The controller 436 directs the driver 80 through the automatic hydraulic valve 238 to position the three-point implement 300 to the predetermined path previously entered into the controller 436 that was entered in the display screen 150b. Then using the sensors 438 and 440 the controller 436 determines the position relationship between the first frame 45 and the second frame 46, the first frame 45 represents the position of the tractor 38 (see FIG. 18a), first frame 45 being securely mounted to the tractor 38 (see FIG. 18a). The controller 436 then positions the tractor 38 (see FIG. 18a), using the auto-steer device 153b after determining the position relationship between sensors 438 and 440.

The control of a towed implement 302 involves slightly more computations by the controller 436 as compared to the control of the three-point implement 300 by the controller 436. The towed implement 302 (see FIG. 18a) control requires the addition of a vertical laser emitter (preferrably rotating for human eye safety) and a laser signal receiver. The vertical laser emitter 426 is mounted on the apparatus 40 first frame 45 (see FIG. 14), this mounting keeps the vertical laser emitter on the same linear track as the tractor 38 (see FIG. 18a), the first frame 45 being rigidly attached to the tractor 38 (see FIG. 18a) three-point hitch. The object is to keep the towed implement 302 on the same linear track as the tractor 38, the tractor 38 should lead or follow the same linear track as the predetermined track of the towed implement 302. While the apparatus 40 second frame 46 is maintained on the predetermined path of the GPS coordinates as directed by the controller 436, the controller 436 also receives current positions of sensors 438 and sensor 440. These sensor 438 and 440 relationships tell the controller 436 the alignment comparison of the first and second frame 45 and 46 of the apparatus 40 (see FIG. 14). The object is to keep the towed implement 302 on the same linear path as the tractor 38 and the apparatus 40 first frame 45 that is mounted to the tractor. The vertical laser emitter is mounted to the first frame 45 and the laser receiver 430 is mounted to the working portion of the implement 302. The object is to keep the laser beam 432 (see FIG. 18a) in the horizontal center of the laser receiver 430 resulting in the towed implement keeping the same linear path as the apparatus 40 first frame 45 and the tractor 38. When the towed implement 38 veers from the same predetermined linear track as the tractor, and the laser beam 432 veers from the horizontal center of the laser receiver 430, the controller will adjust the apparatus 40 second frame 46 to eventually move the working portion of the implement 302 and realign the laser beam 432 with the horizontal center of the laser receiver 430 mounted on the working portion of the tractor, therefore also realigning the towed implement 302 with the linear path as the tractor 38. When the controller 436 moves the apparatus 40 second frame 46 to reposition the towed implement 302, the relationship between the sensors 438 and 440 will change, (sensors 438 and 440 relationship controls the steering of the tractor with the auto-steer device 153b), the controller 436 can compute the sensors 438 and 440 relationship change as it computes the relationship between the laser receiver 430 mounted on the towed implement 302 and the position of the apparatus 40 first frame 45 where the vertical laser emitter 426 is mounted.

Then the controller 436 adjusts its computations by comparing the change in the sensors 438 and 440 position relationship with the position relationship of the vertical laser emitter 426 (mounted on the first frame 45) and the laser receiver 430 (mounted on the towed implement 302). This process allows the controller 436 to simultaneously reposition the towed implement 302 and auto-steer the tractor 38 while maintaining a predetermined linear path of the towed implement 302 and the tractor 38 while using a GPS receiver mounted on the apparatus 40 second frame 46. In the above stated positioning system, only one GPS receiver in required to control the position of the tractor 38 and the towed implement 302 on the same predetermined path. Other current positioning systems in use in the agricultural industry require a first GPS receiver mounted on the tractor 38 and a second GPS receiver mounted on the towed implement 302, both GPS receivers possibly prone to errors. One GPS receiver prone to errors is an improvement over two GPS receivers prone to errors. Local tractor and implement mounted position signal emitters and receivers are more accurate and dependable than GPS emitters and receivers where the signals travel many miles in length.

Although the present invention has been described in considerable detail with reference to certain preferred versions thereof, other versions are possible. For example, any combination of the differences between the various versions of the invention can be used with other versions of the invention disclosed herein. Therefore, the spirit and scope of the appended claims should not be limited to the description of the preferred versions contained herein.

Specific features of the invention are:

The system can comprise at least three holes in the drawbar and the coupling has at least three pins, one in each hole.

The implement can be connected to the connecting apparatus that is connected to the mobile machinery by the arms and the coupling.

The apparatus can comprise at least one apparatus height gauge member attached to the first framework or to the second framework.

The apparatus can comprise at least two height gauge members, at least one height gauge member attached to the first framework and at least one height gauge member attached to the second framework. The height gauge members are also support members supporting the apparatus on the surface below. The height gauge member can comprise a wheel or a skid plate.

The height gauge member positions can be adjustable.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

What is claimed is:

1. Apparatus for connecting an implement to a three-point hitch of mobile machinery comprising:
   a) a first framework having a height, a length, and a depth and comprising at least two parallel, vertically spaced apart laterally extending rails, an upper cross beam, a lower crossbeam, and at least two upwardly extending, laterally spaced apart studs attached to the cross beams and the rails, wherein the rails, the studs, and the cross beams are coplanar in a first framework plane, the first framework plane extending along the height and the length of the first framework;
   b) a slidable second framework comprising at least two upwardly extending, laterally spaced apart posts and at least two sleeves attached to the posts, the posts and the sleeves being coplanar in the first framework plane, and wherein each sleeve is a hollow tube sleeve with a rail passing through the sleeve so that the slidable second framework can slide laterally back and forth along the rails;
   c) three attachments attached to the first framework for attachment to the three point hitch, the attachments comprising an upper attachment attached to the upper cross beam and two lower attachments attached to the lower cross beam;
   d) three connectors supported by the slidable second framework for connecting the slidable second framework to the implement for lifting, leveling, pulling, pushing and movement applications of the implement by the mobile machinery and the slidable second framework;
   e) at least one driver connected to the first framework and connected to the slidable second framework for driving the slidable second framework laterally back and forth along the first framework;
   f) at least one lower support member attached to at least one of (i) the slidable second framework for engaging the lower crossbeam or (ii) the lower crossbeam for engaging the slidable second framework, and
   g) at least one upper support member attached to at least one of (i) the slidable second framework for engaging the upper crossbeam or (ii) the upper crossbeam for engaging the slidable second framework.

2. The apparatus of claim 1, wherein the implement is connected to at least one connector for towing the implement, the apparatus further comprising:
   (i) a local first sensor system for determining the position of the implement relative to the first framework and generating a first output signal;
   (ii) a local second sensor system for determining the position of the first framework relative to the position of the second framework and generating a second output signal;
   (iii) a Global Positioning system (GPS) for determining the location of the second framework and generating a third output signal; and
   (iv) a controller for receiving the first, the second, and the third output signals.

3. The apparatus of claim 1 further comprising at least one height gauge member attached to the first framework or attached to the second framework.

4. The apparatus of claim 1 wherein the upper support member provides vertical and lateral support to the second framework and the lower support member provides resistance against vertical and lateral forces to the second framework.

5. The apparatus of claim 1, wherein the upper support member provides a secure engagement for both vertical and horizontal support to the second framework, and the lower support member provides a secure engagement for both vertical and horizontal support to the second framework.

6. The apparatus of claim 1, wherein the first framework lower crossbeam connects to a coupling suitable for a releasable connection to a mobile machinery towing drawbar.

7. The apparatus of claim 6 wherein the coupling connection to the towing drawbar and the lower crossbeam is a secured and releasable rigid connection.

8. The apparatus of claim 7 wherein the coupling releasable connection is released from the towing drawbar upon the raising of the apparatus.

9. The apparatus of claim 1 comprising four connectors for connecting the second framework to the implement.

10. The apparatus of claim 1 wherein the support members comprise rollers.

11. The apparatus of claim 10 wherein the rollers are wheels having a rolling surface.

12. The apparatus of claim 11 wherein the wheels are V-shaped wheels.

13. The apparatus of claim 11 wherein the rolling surface of the wheels is concave.

14. The apparatus of claim 1 wherein the lower support member comprises a sliding plate on (i) the lower crossbeam, or (ii) the second framework, or (iii) both the lower crossbeam and the second framework, each sliding plate having a sliding surface.

15. The apparatus of claim 1 wherein the upper support member comprises a sliding plate on (i) the upper crossbeam, or (ii) the second framework, or (iii) both the upper crossbeam and the second framework, each sliding plate having a sliding surface.

16. The apparatus of claim 2 wherein from the received signals, through programming in the controller:
    (i) determining the position of the implement;
    (ii) comparing the determined position to a desired path for the implement,
    (iii) the desired path stored in memory associated with the controller; and
    (iv) if the determined position is different than the desired path, the controller adjusting the position of the implement using lateral adjustment of the sliding second framework.

* * * * *